(12) United States Patent
Kato

(10) Patent No.: US 10,816,843 B2
(45) Date of Patent: Oct. 27, 2020

(54) DISPLAY DEVICE AND LIQUID CRYSTAL DISPLAY DEVICE FOR ADJUSTING TRANSPARENCY AND POLARITY

(71) Applicant: Japan Display Inc., Minato-ku (JP)

(72) Inventor: Hirofumi Kato, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 16/244,213

(22) Filed: Jan. 10, 2019

(65) Prior Publication Data
US 2019/0228719 A1   Jul. 25, 2019

(30) Foreign Application Priority Data
Jan. 19, 2018   (JP) .................. 2018-007524

(51) Int. Cl.
*G02F 1/1334* (2006.01)
*F21V 8/00* (2006.01)
(Continued)

(52) U.S. Cl.
CPC ......... *G02F 1/1334* (2013.01); *G02B 6/0035* (2013.01); *G02F 1/137* (2013.01); *G02F 1/1368* (2013.01); *G02F 1/134309* (2013.01); *G02F 1/136286* (2013.01); *G09G 3/3413* (2013.01); *G09G 3/3614* (2013.01); *G02F 1/1362* (2013.01); *G02F 2201/121* (2013.01); *G02F 2201/123* (2013.01); *G09G 2310/0235* (2013.01); *G09G 2310/06* (2013.01); *G09G 2320/0209* (2013.01)

(58) Field of Classification Search
CPC ............... G09G 3/3413; G09G 3/3614; G09G 2310/0235; G09G 2310/06; G09G 2320/0209; G02F 1/134309; G02F 1/1368; G02F 1/1334; G02F 1/137; G02F 1/136286; G02F 1/1362; G02F 2201/121; G02F 2201/123; G02B 6/004; G02B 6/0041; G02B 6/0016; G02B 6/0011; G02B 6/0026; G02B 6/0063

See application file for complete search history.

(56) References Cited

U.S. PATENT DOCUMENTS 10,515,597 B2 * 12/2019 Cui .................. G02F 1/133528
2004/0183768 A1    9/2004 Yamato et al.
(Continued)

FOREIGN PATENT DOCUMENTS

JP   2004-287087   10/2004
JP   2016-145869   8/2016

*Primary Examiner* — Darlene M Ritchie
(74) *Attorney, Agent, or Firm* — Oblon, McClelland, Maier & Neustadt, L.L.P.

(57) ABSTRACT

According to one embodiment, a display device includes a display panel including a display area where first drive areas and second drive areas are alternately disposed, and display function layers which include first display function layers and second display function layers and which are changed to a transparent state and a scattering state, and a control unit. The control unit applies a drive voltage to the first display function layers, in a first field period. The control unit applies the drive voltage to the second display function layers, in a second field period. A polarity of the drive voltage in the first field period is different from a polarity of the drive voltage in the second field period.

13 Claims, 26 Drawing Sheets

(51) Int. Cl.
  *G09G 3/34*     (2006.01)
  *G09G 3/36*     (2006.01)
  *G02F 1/1343*   (2006.01)
  *G02F 1/1368*   (2006.01)
  *G02F 1/137*    (2006.01)
  *G02F 1/1362*   (2006.01)

(56) References Cited

U.S. PATENT DOCUMENTS

| | | | |
|---|---|---|---|
| 2015/0355492 A1* | 12/2015 | Chu Ke | G02F 1/134309 |
| | | | 257/72 |
| 2016/0231497 A1 | 8/2016 | Kato | |
| 2017/0256210 A1* | 9/2017 | Kato | G02F 1/137 |
| 2018/0267344 A1* | 9/2018 | Wu | G02F 1/1323 |
| 2018/0350311 A1* | 12/2018 | Aoyama | G09G 3/3611 |
| 2019/0302529 A1* | 10/2019 | Zha | G02F 1/133528 |

* cited by examiner

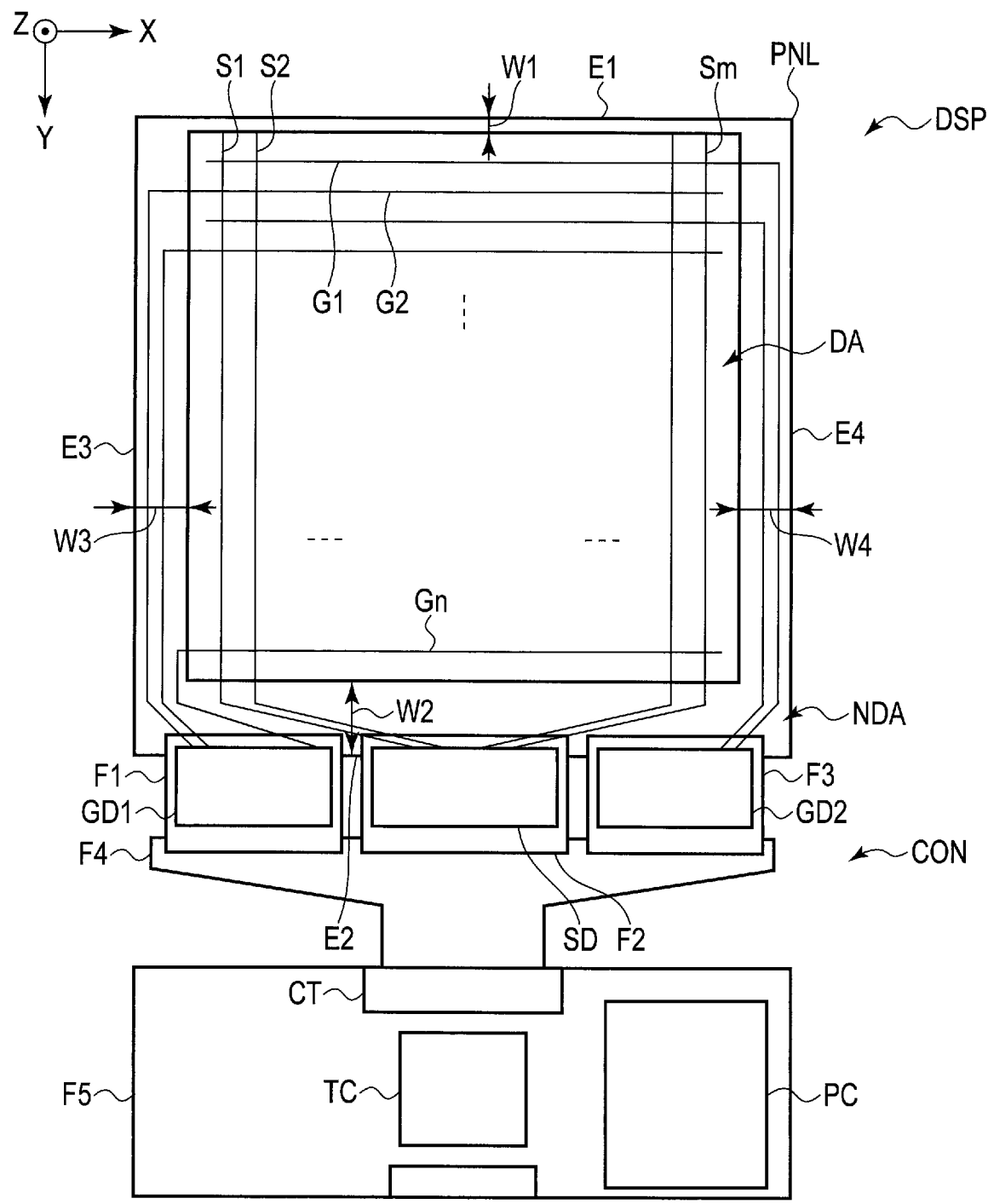
F I G. 1

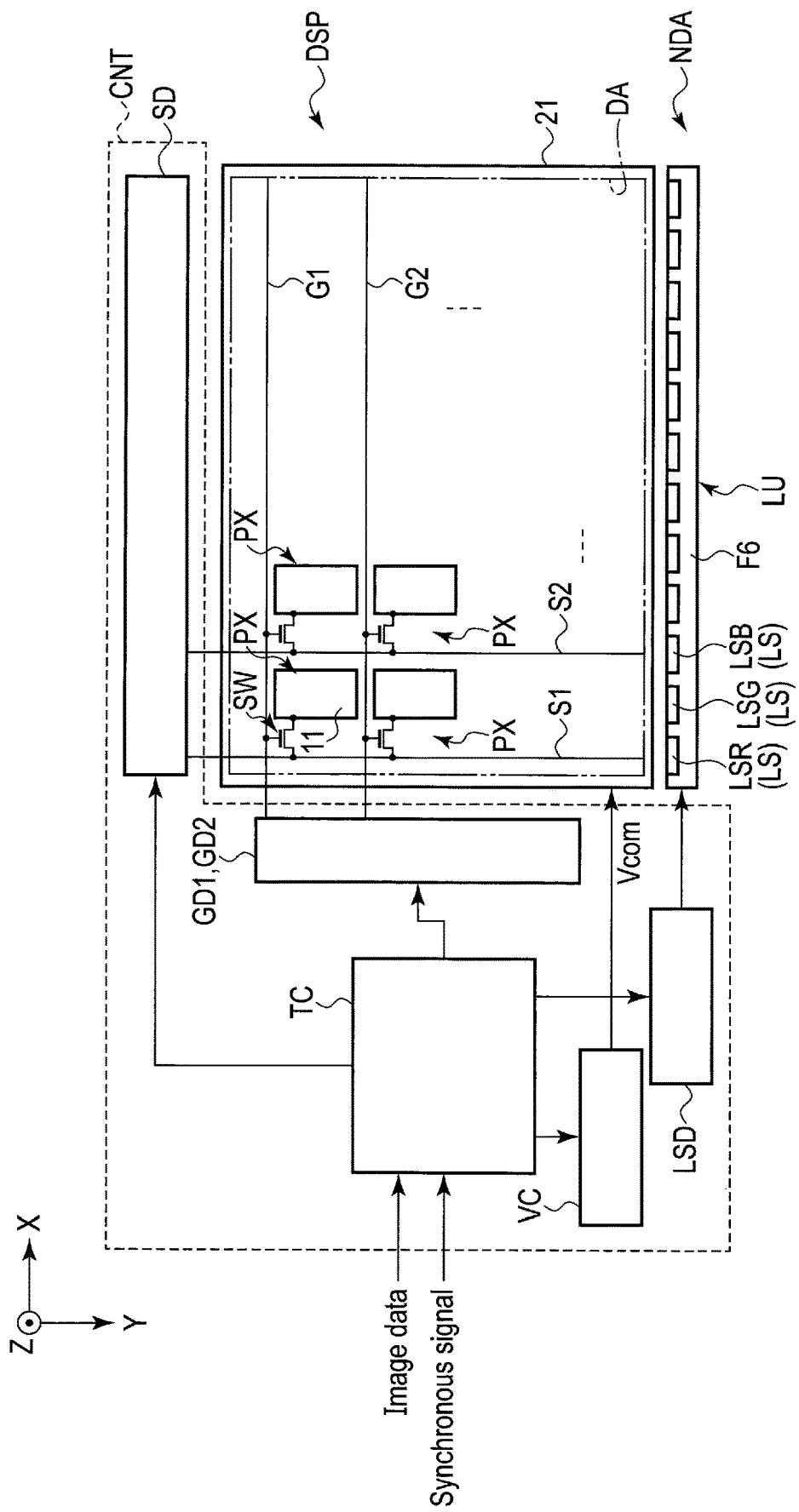
F I G. 3

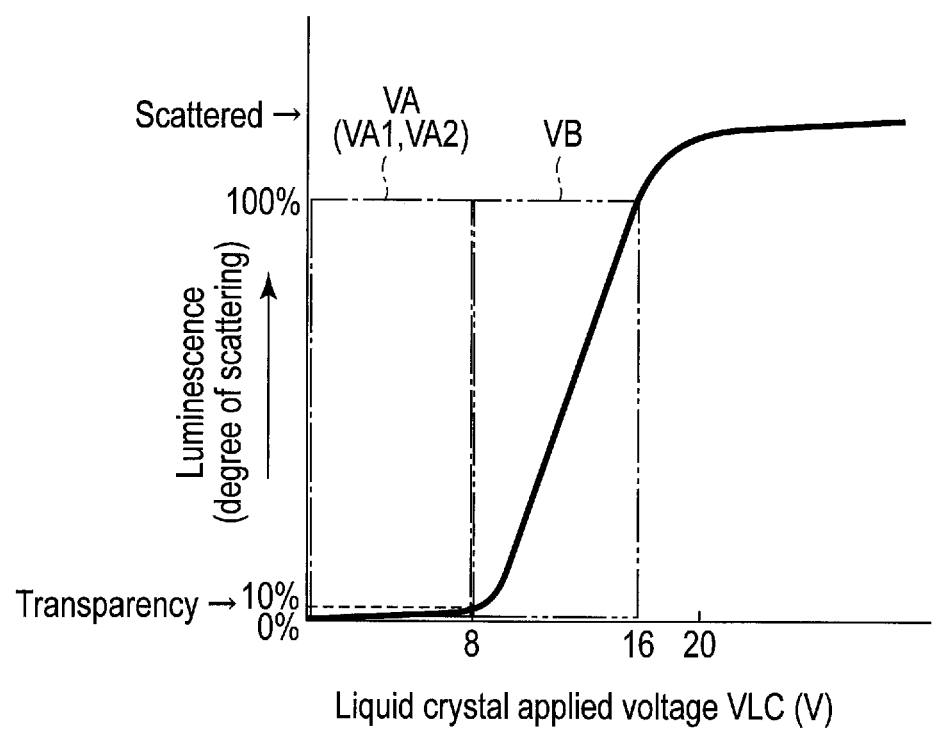
F I G. 6

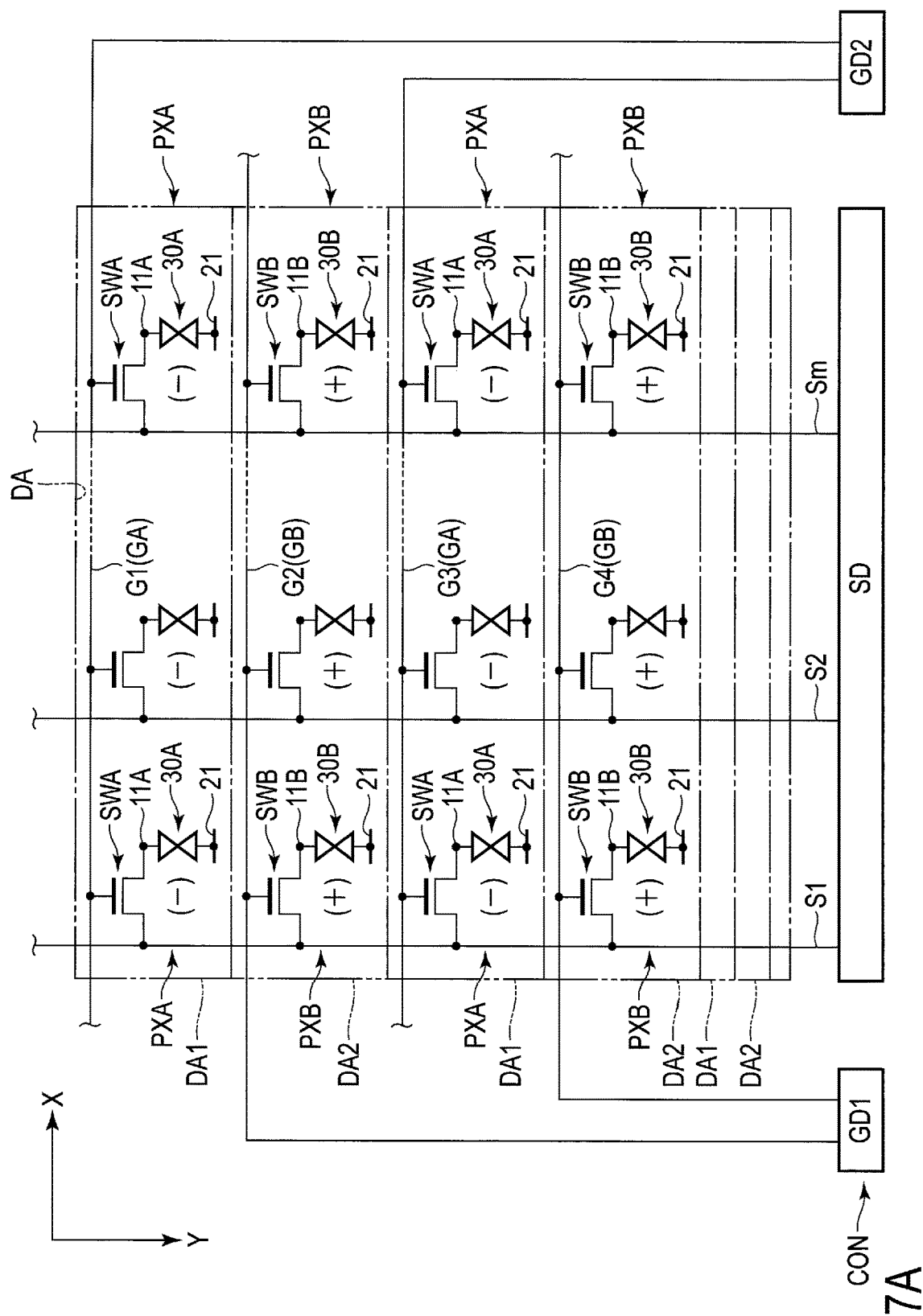
F I G. 7A

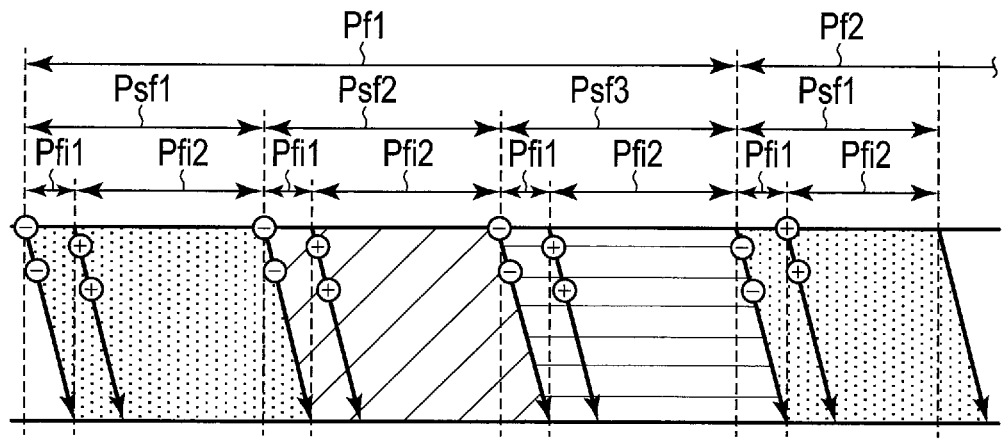
F I G. 9
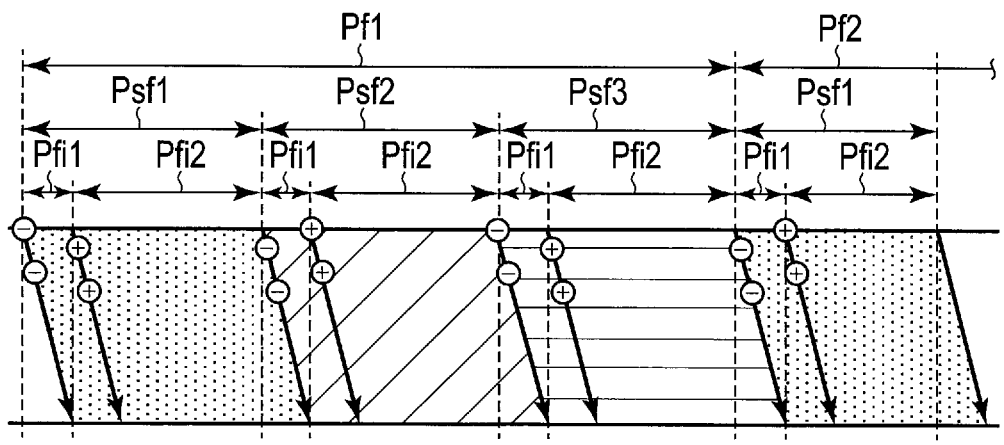
F I G. 10

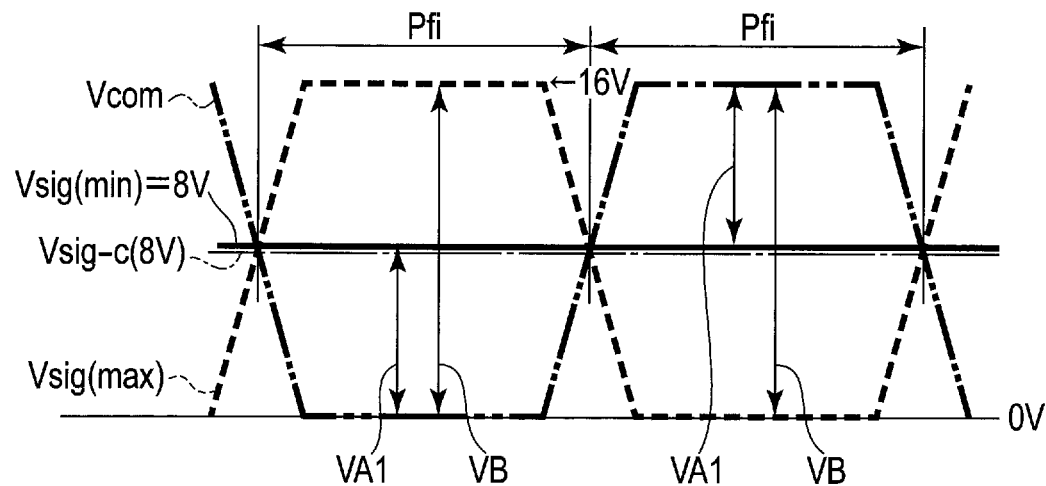
F I G. 12
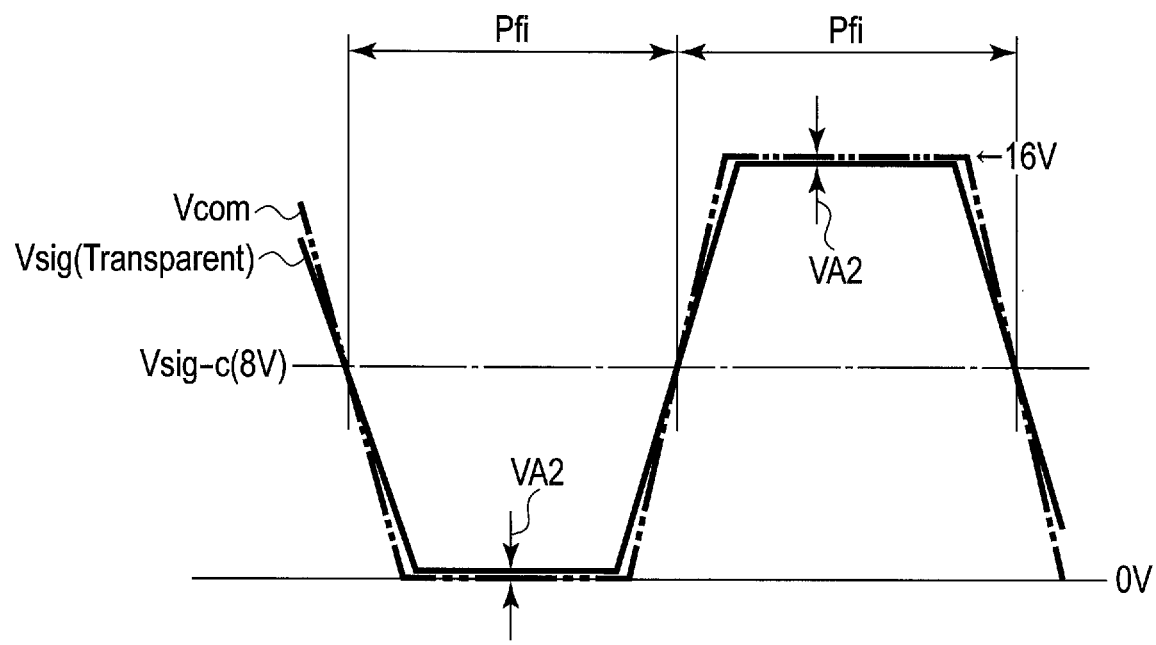
F I G. 13

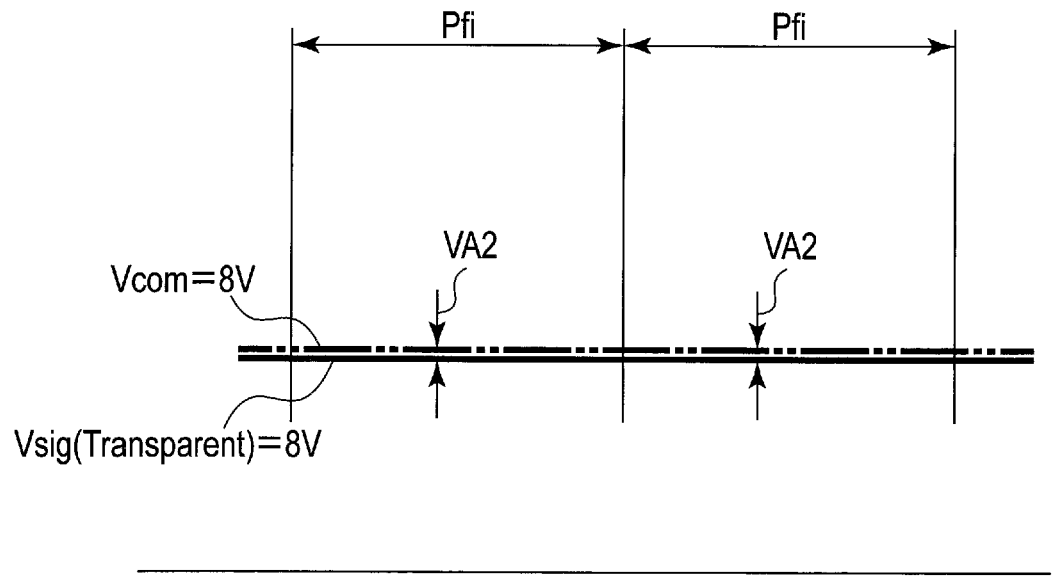
F I G. 14
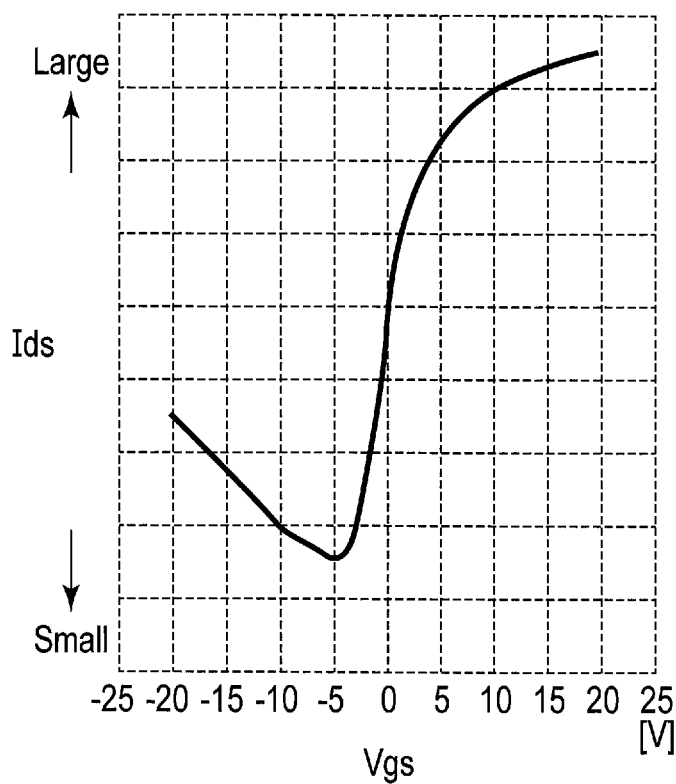
F I G. 15

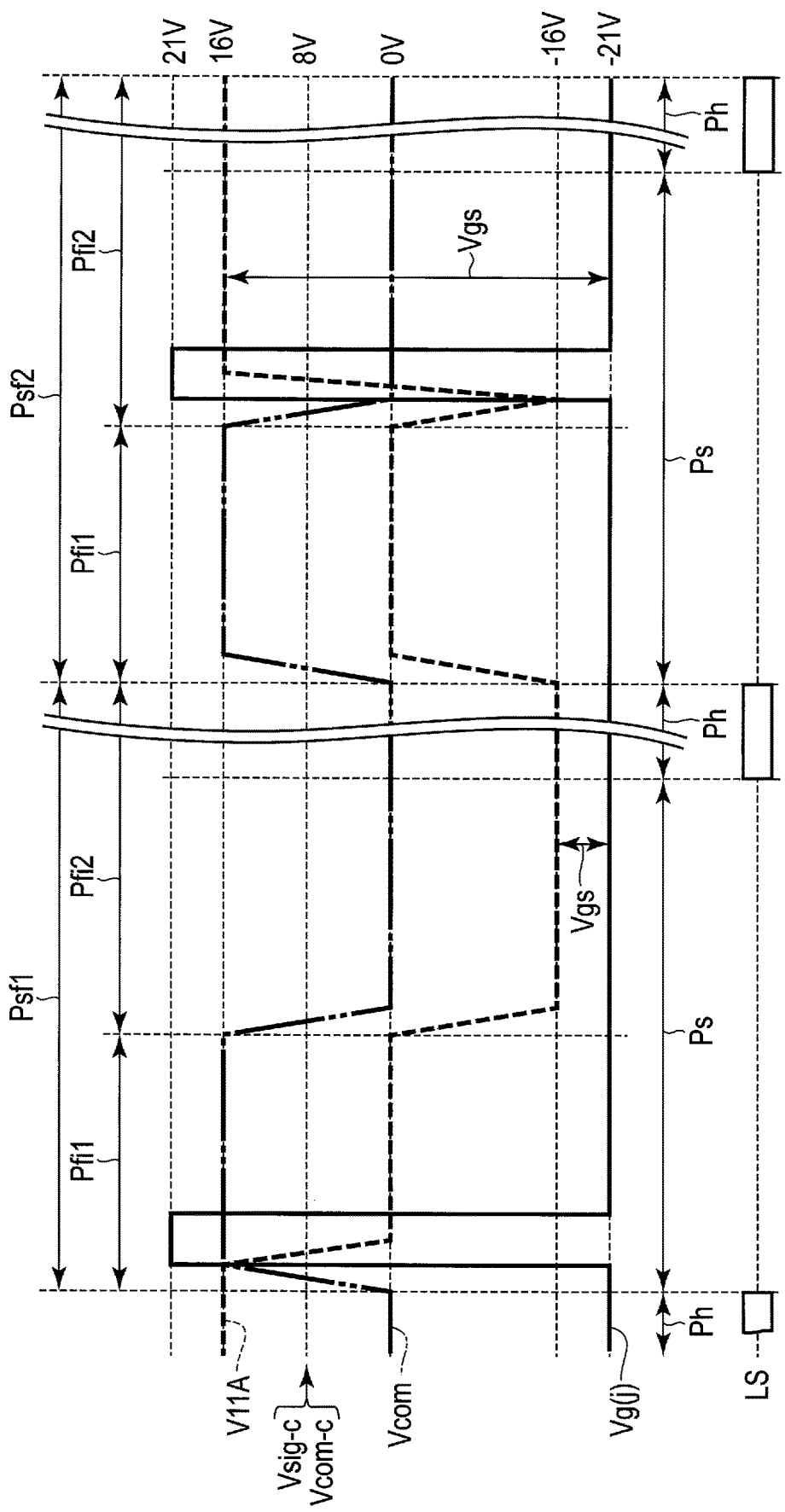
F I G. 17A

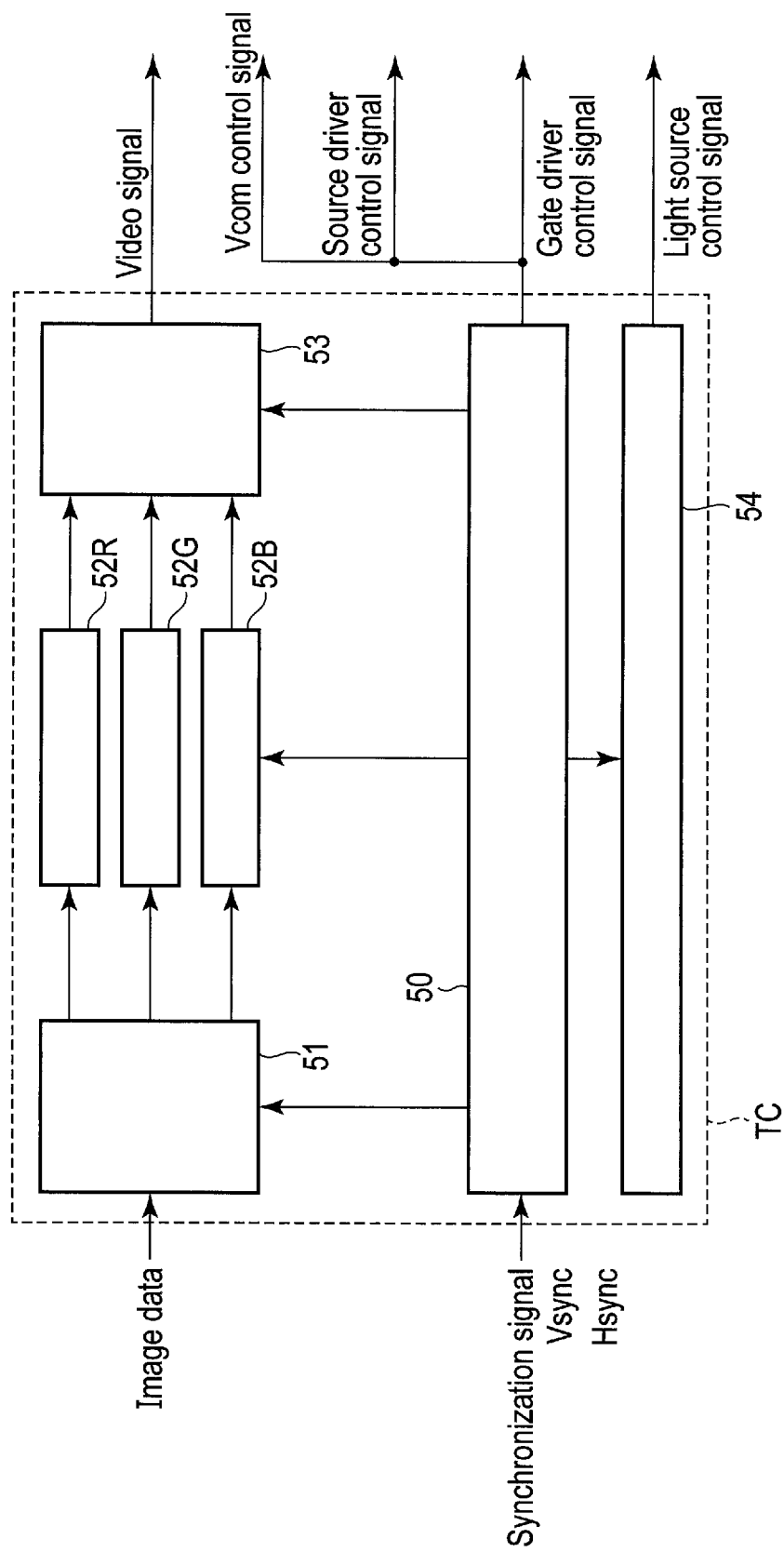
F I G. 19

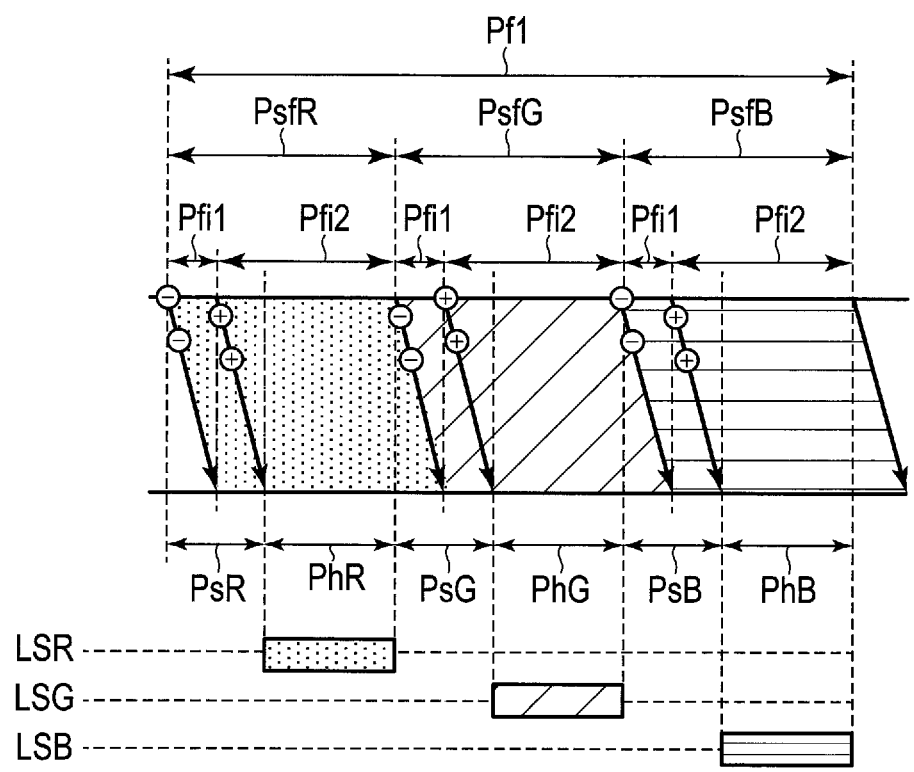
F I G. 23

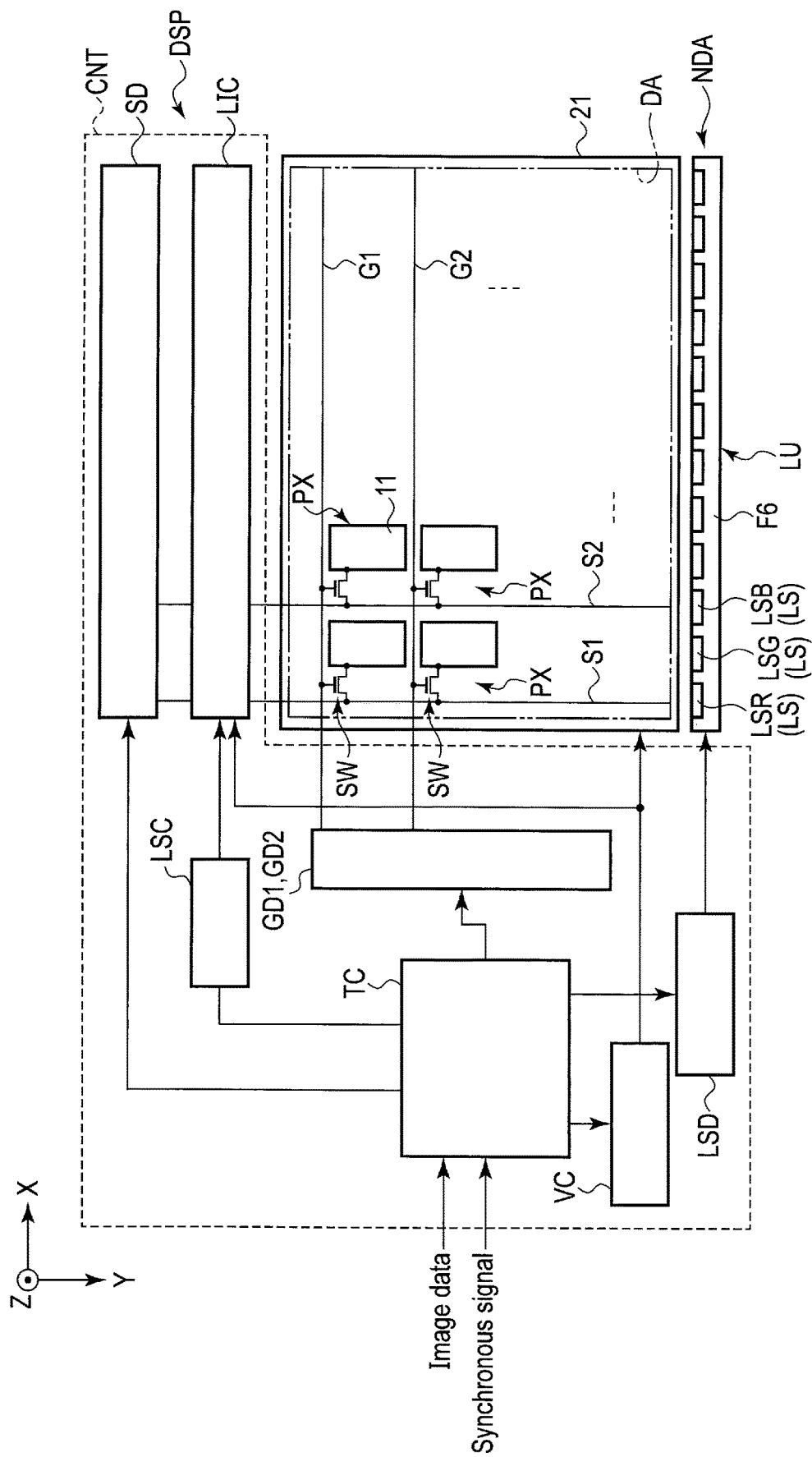
F I G. 24

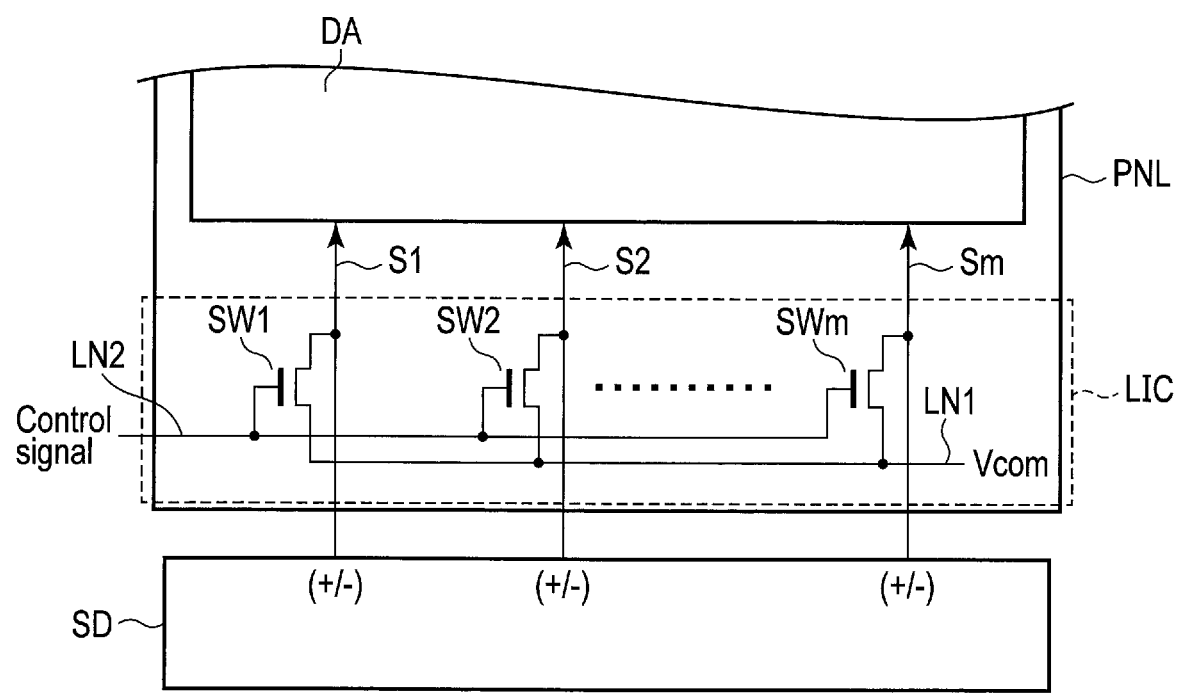
F I G. 25

DISPLAY DEVICE AND LIQUID CRYSTAL DISPLAY DEVICE FOR ADJUSTING TRANSPARENCY AND POLARITY

CROSS-REFERENCE TO RELATED APPLICATIONS

This application is based upon and claims the benefit of priority from Japanese Patent Application No. 2018-007524, filed Jan. 19, 2018, the entire contents of which are incorporated herein by reference.

FIELD

Embodiments described herein relate generally to a display device and a liquid crystal display device.

BACKGROUND

Recently, display devices comprising a polymer dispersed liquid crystal (hereinafter called "PDLC") panel capable of switching a diffusing state of diffusing incident light and a transmitting state of allowing the incident light to be transmitted, displaying an image, and allowing a background to be transmitted and the image to be visually recognized, have been proposed. In such a display device, one frame period includes sub-frame periods, and multi-color display is implemented by displaying the image while changing a display color in each of the sub-frame period.

BRIEF DESCRIPTION OF THE DRAWINGS

FIG. 1 is a plan view showing a configuration example of a display device according to a first embodiment.

FIG. 3 is a diagram showing main constituent elements of the display device shown in FIG. 1.

FIG. 6 is a graph showing the scattering characteristic of the liquid crystal layer.

FIG. 7A is a diagram showing a summary of one-line-inversion drive scheme, illustrating a state in which a negative-polarity drive voltage is applied to a first liquid crystal layer and a positive-polarity drive voltage is applied to a second liquid crystal layer.

FIG. 9 is a timing chart showing a display operation, for explanation of a third driving method performed by the control unit.

FIG. 10 is a timing chart showing a display operation, for explanation of a fourth driving method performed by the control unit.

FIG. 12 is a chart showing examples of a common voltage and a signal line voltage in a display scanning.

FIG. 13 is a chart showing examples of a common voltage and a signal line voltage in a transparent scanning.

FIG. 14 is a chart showing other examples of the common voltage and the signal line voltage in the transparent scanning.

FIG. 15 is a graph showing a variation in a current flowing between a drain electrode and a source electrode of the switching element showing in FIG. 7A and the like, to a voltage applied between a gate electrode and the source electrode of the switching element.

FIG. 17A is the other timing chart showing variations in a first pixel electrode potential, a common voltage, and a scanning signal voltage in a first sub-frame period and a second sub-frame period in a case of differentiating polarities of the pixels in each sub-frame period.

FIG. 19 is a diagram showing a configuration example of the timing controller shown in FIG. 3.

FIG. 23 is a timing chart showing another example of the display operation.

FIG. 24 is a diagram showing main constituent elements of a display device according to a second embodiment.

FIG. 25 is a diagram showing a configuration example of a Vcom pull-in circuit shown in FIG. 24.

DETAILED DESCRIPTION

Figure 2:
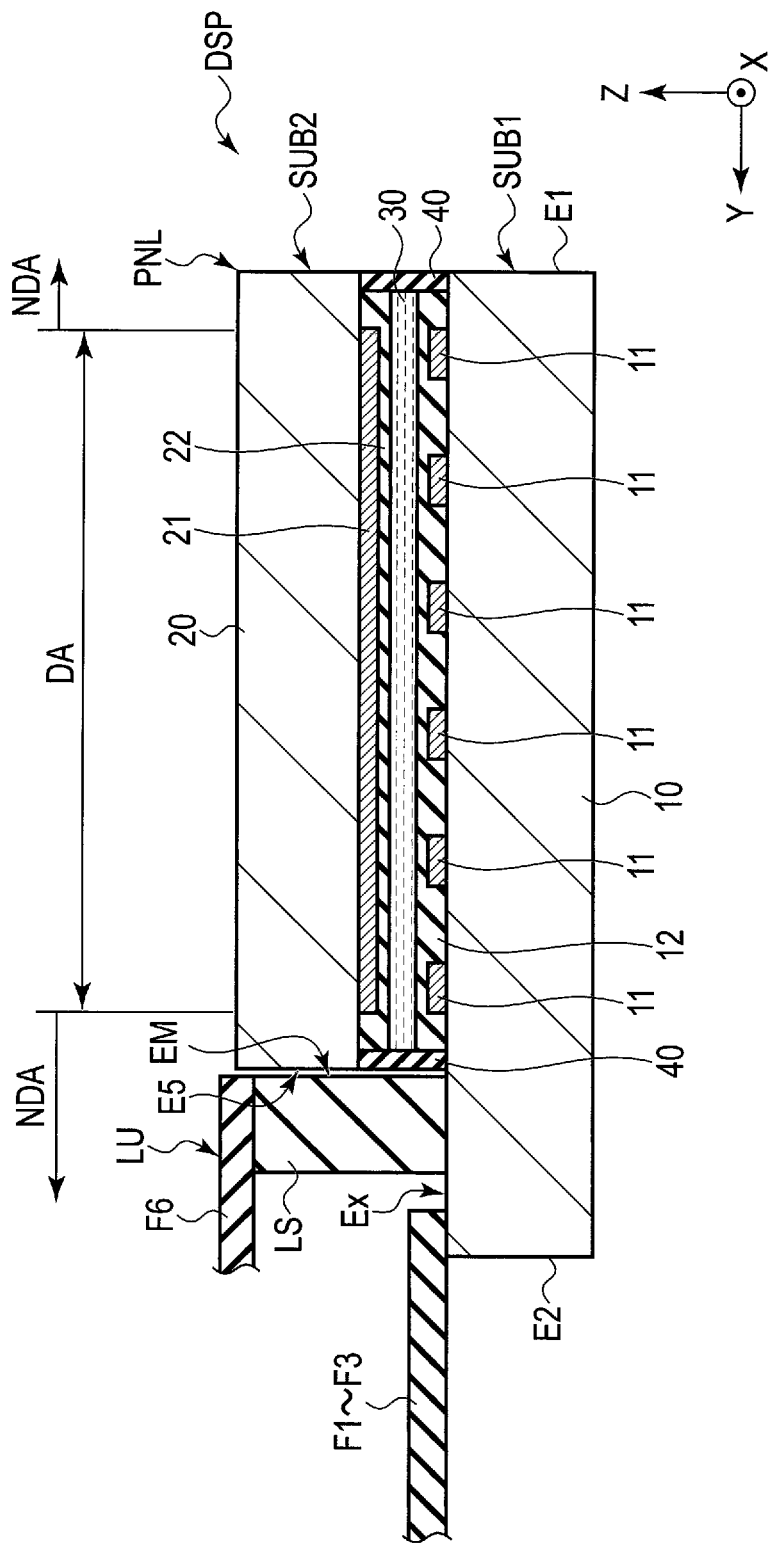
FIG. 2 is a cross-sectional view showing the display device shown in FIG. 1.

In general, according to one embodiment, there is provided a display device comprising: a display panel including a display area where first drive areas extending in a row direction and second drive areas extending in the row direction are alternately disposed in a columnar direction, and display function layers which include first display function layers located in the first drive areas and second display function layers located in the second drive areas and which are changed to a transparent state of urging incident light to be transmitted and a scattering state of scattering the incident light; and a control unit which controls drive of the display panel and changes a state of the display function layers to at least one of the transparent state and/or the scattering state. The control unit applies a drive voltage to the first display function layers, in a first field period of a first sub-frame period. The control unit applies the drive voltage to the second display function layers, in a second field period following the first field period of a first sub-frame period. A polarity of the drive voltage in the first field period is different from a polarity of the drive voltage in the second field period.

According to another embodiment, there is provided a liquid crystal display device comprising: a display panel including a display area where first drive areas extending in a row direction and second drive areas extending in the row direction are alternately disposed in a columnar direction, and liquid crystal layers which include first liquid crystal layers located in the first drive areas and second liquid crystal layers located in the second drive areas and which are changed to a transparent state of urging incident light to be transmitted and a scattering state of scattering the incident light by using reverse mode polymer dispersed liquid crystal; and a control unit which controls drive of the display panel and changes a state of the liquid crystal layers to at least one of the transparent state and/or the scattering state. The control unit applies a drive voltage to the first liquid crystal layers, in a first field period of a first sub-frame period. The control unit applies the drive voltage to the second liquid crystal layers, in a second field period following the first field period of a first sub-frame period. A polarity of the drive voltage in the first field period is different from a polarity of the drive voltage in the second field period.

Various embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented, but such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

In each of the embodiments, a display device employing polymer dispersed liquid crystal will be explained as an example of the display device. The display device of each of the embodiments can be used in, for example, various devices such as smartphones, tablet terminals and cell phone terminals.

First Embodiment

FIG. 1 is a plan view showing a configuration example of a display device DSP according to the present embodiment.

As shown in FIG. 1, a first direction X and a second direction Y are directions intersecting each other, and a third direction Z is a direction intersecting the first direction X and the second direction Y. The first direction X corresponds to the row direction while the second direction Y corresponds to the columnar direction. For example, the first direction X, the second direction Y, and the third direction Z are orthogonal to one another but may intersect at an angle other than 90 degrees. In the present specification, a direction toward a pointing end of an arrow indicating the third direction Z is referred to as upward (or merely above), and a direction toward the opposite side from the pointing end of the arrow is referred to as downward (or merely below).

The display device DSP comprises a display panel PNL, circuit boards (wiring substrates) F1 to F5, and the like. The display panel PNL includes a display area DA on which an image is displayed and a frame-shaped non-display area NDA surrounding the display area DA. The display area DA includes n scanning lines G (G1 to Gn), m signal lines S (S1 to Sm), and the like. Each of n and m is a positive integer, and n may be equal to or different from m. The scanning lines G extend in the first direction X and are spaced apart and arranged in the second direction Y. In other words, the scanning lines G extend in the row direction. The signal lines S extend in the second direction Y and are spaced apart and arranged in the first direction X.

The display panel PNL includes end portions E1 and E2 along the first direction X, and end portions E3 and E4 along the second direction Y. In the width of the non-display area NDA, a width W1 between the end portion E1 and the display portion DA in the second direction Y is smaller than a width W2 between the end portion E2 and the display area DA in the second direction Y. In addition, a width W3 between the end portion E3 and the display portion DA in the first direction X is equal to a width W4 between the end portion E4 and the display area DA in the first direction X. In addition, each of the widths W3 and W4 is smaller than the width W2. In addition, each of the widths W3 and W4 may be equal to the width W1 or may be different from the width W1.

The circuit boards F1 to F3 are arranged in this order in the first direction X. The circuit board F1 is provided with a gate driver GD1. The circuit board F2 is provided with a source driver SD. The circuit board F3 is provided with a gate driver GD2. Each of the circuit boards F1 to F3 is connected to the display panel PNL and the circuit board F4. The circuit board F5 is provided with a timing controller TC, a power supply circuit PC, and the like. The circuit board F4 is connected to a connector CT of the circuit board F5. The circuit boards F1 to F3 may be replaced with a single circuit board. In addition, the circuit boards F1 to F4 may be replaced with a single circuit board. The gate driver GD1, the gate driver GD2, the source driver SD, and the timing controller TC explained above constitute a control unit CON of the present embodiment, and the control unit CON is configured to control drive of pixel electrodes to be explained below, a common electrode to be explained below, and a light source unit to be explained below.

In the example illustrated, the scanning lines G of odd numbers from the end portion E1 side are connected to the gate driver GD2 and the scanning lines G of even numbers are connected to the gate driver GD1, but the relationship in connection between the gate drivers GD1 and GD2, and the scanning lines G is not limited to the example illustrated.

FIG. 2 is a cross-sectional view showing the display device DSP shown in FIG. 1. Main portions alone in the cross-section of the display device DSP in a Y-Z plane defined by the second direction Y and the third direction Z will be explained here.

As shown in FIG. 2, the display panel PNL includes a first substrate SUB1, a second substrate SUB2, a liquid crystal layer 30 serving as a display function layer, and the like. The first substrate SUB1 comprises a transparent substrate 10, pixel electrodes 11, an alignment film 12, and the like. The second substrate SUB2 comprises a transparent substrate 20, a common electrode 21, an alignment film 22, and the like. The pixel electrodes 11 and the common electrode 21 are formed of, for example, a transparent conductive material such as indium tin oxide (ITO) or indium zinc oxide (IZO). The liquid crystal layer 30 is located in at least the display area DA. The liquid crystal layer 30 contains polymer dispersed liquid crystal and is located between the alignment films 12 and 22. The liquid crystal layer 30 of the present embodiment uses reverse mode polymer dispersed liquid crystal (R-PDLL). The liquid crystal layer 30 maintains parallelism of light incident when the applied voltage is low or scatters the incident light when the applied voltage is high. The first substrate SUB1 and the second substrate SUB2 are bonded to each other by a sealing member 40. The first substrate SUB1 comprises extension portion EX extending farther in the second direction Y than the end portion E5 of the transparent substrate 20.

The circuit boards F1 to F3 are connected to the extension portion EX of the first substrate SUB1.

A light source unit LU is located in the non-display area NDA outside the display area DA. The light source unit LU comprises a light-emitting element LS, a circuit board F6, and the like. The light-emitting element LS is connected to the circuit board F6 and located on the extension portion EX. The light-emitting element LS comprises a light-emitting portion (light-emitting surface) EM opposed to the end portion E5. Illumination light emitted from the light-emitting portion EM is made incident on the end portion E5 to propagate through the display panel PNL as explained below.

FIG. 3 is a diagram showing main constituent elements of the display device DSP shown in FIG. 1.

As shown in FIG. 3, the display device DSP comprises a controller CNT represented by a dashed line in the drawing. The controller CNT comprises a timing controller TC, gate drivers GD1 and GD2, a source driver SD, a Vcom circuit VC, a light source driver LSD, and the like.

The timing controller TC generates various signals, based on image data, a synchronization signal, and the like input from the outside. For example, the timing controller TC outputs a video signal generated by executing predetermined signal processing, based on the image data, to the source driver SD. In addition, the timing controller TC outputs the control signal generated based on the synchronization signal to each of the gate drivers GD1 and GD2, the source driver SD, the Vcom circuit VC, and the light source driver LSD. The timing controller TC will be explained below in detail.

The display area DA represented by a two-dotted-chain line in the drawing includes pixels PX. Each of the pixels PX comprises a switching element SW and the pixel electrode 11. The switching element SW is formed of, for example, a thin-film transistor. The switching element SW is electrically connected to the scanning line G and the signal line S. The pixel electrodes 11 are located in the display area DA and arrayed in a matrix. For this reason, for example, the pixel electrodes 11 are disposed in plural rows. The pixel electrode 11 is connected to the signal line S via the switching element SW. The common electrode 21 is disposed in the display area DA. The common electrode 21 is opposed to the pixel electrodes 11. Unlike the present embodiment, the common electrode 21 may be divided for each of at least one pixel PX and connected to each common line, and a common voltage may be applied to the divided common electrodes. A scanning signal is supplied from the gate driver GD1 or GD2 to each of the scanning lines G. The video signal (image signal) is supplied from the source driver SD to each of the signal lines S. A common voltage Vcom is supplied from the Vcom circuit VC to the common electrode 21. The video signal supplied to the signal line S is applied to the pixel electrode 11 connected to the switching element SW, in a period in which the switching element SW becomes conductive based on the scanning signal supplied to the scanning line G. In the following explanations, forming a potential difference between the pixel electrode 11 and the common electrode 21 by supplying the video signal to the pixel electrode 11 is often represented as writing the video signal (or applying the voltage) to the pixel PX comprising the pixel electrode 11.

The light source unit LU is configured to emit light of a color other than achromatic to the liquid crystal layer 30. The light source unit LU comprises light-emitting elements LS of plural colors. For example, the light source unit LU comprises a light-emitting element (first light-emitting element) LSR which emits light of a first color to the liquid crystal layer 30, a light-emitting element (second light-emitting element) LSG which emits light of a second color to the liquid crystal layer 30, and a light-emitting element (third light-emitting element) LSB which emits light of a third color to the liquid crystal layer 30. It is needless to say that the first, second, and third colors are different from one another. In the present embodiment, the first color is red, the second color is green, and the third color is blue. The light source driver LSD controls lighting periods of the light-emitting elements LSR, LSG, and LSB. In a driving system in which a one-frame period includes sub-frame periods, at least one of three light-emitting elements LSR, LSG, and LSB is turned on in each of the sub-frames such that the color of the illumination light is changed in each sub-frame, which will be explained below in detail.

A configuration example of the display device comprising the liquid crystal layer 30 which is a polymer dispersed liquid crystal layer will be hereinafter explained.

Figure 4A:
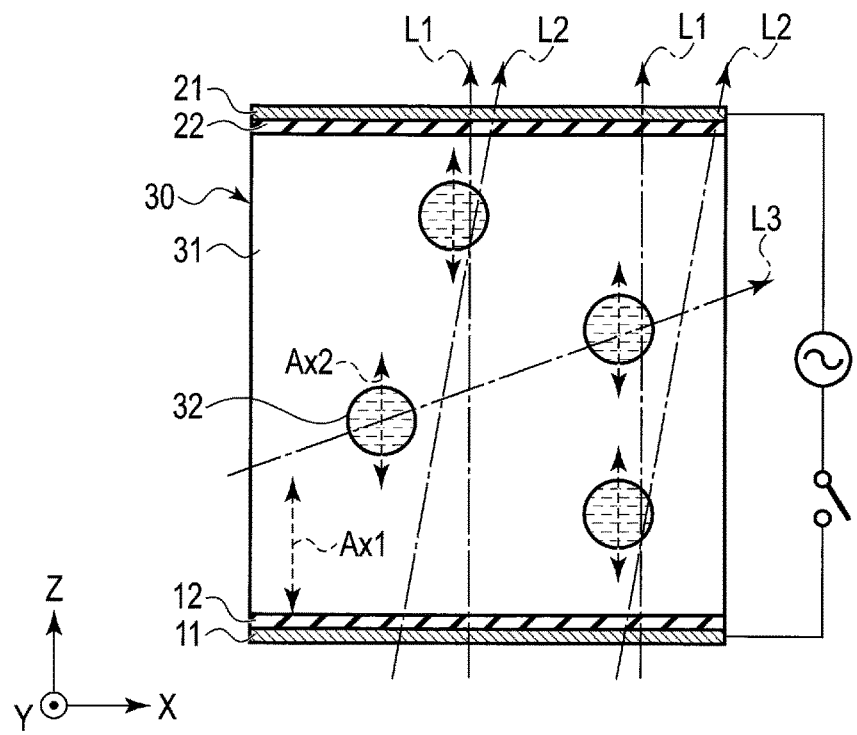
FIG. 4A is an illustration schematically showing a liquid crystal layer in a transparent state.

FIG. 4A is an illustration schematically showing the liquid crystal layer 30 in a transparent state.

As shown in FIG. 4A, the liquid crystal layer 30 includes a liquid crystal polymer 31 and liquid crystal molecules 32. The liquid crystal polymer 31 can be obtained by, for example, polymerizing liquid crystal monomer in a state of being aligned in a predetermined direction by the alignment restriction force of the alignment films 12 and 22. The liquid crystal molecules 32, dispersed in the liquid crystal monomer, are aligned in a predetermined direction depending on the alignment direction of the liquid crystal monomer when the liquid crystal monomer is polymerized. The alignment films 12 and 22 may be horizontal alignment films which align the liquid crystal monomer and the liquid crystal molecules 32 along the X-Y plane defined by the first direction X and the second direction Y or may be vertical alignment films which align the liquid crystal monomer and the liquid crystal molecules 32 along the third direction Z.

The liquid crystal molecules 32 may be positive type molecules having a positive dielectric anisotropy or negative type molecules having a negative dielectric anisotropy. The liquid crystal polymer 31 and the liquid crystal molecules 32 have equivalent optical anisotropy. Alternatively, the liquid crystal polymer 31 and the liquid crystal molecules 32 have approximately equivalent refractive anisotropy. In other words, each of the liquid crystal polymer 31 and the liquid crystal molecules 32 has approximately equivalent ordinary refractive index and extraordinary refractive index. The values of the ordinary refractive index and extraordinary refractive index of the liquid crystal polymer 31 and the liquid crystal molecules 32 may not be completely equal but difference resulting from the error in manufacturing or the like is allowed. In addition, the liquid crystal polymer 31 and the liquid crystal molecules 32 are different in responsiveness to the electric field. That is, the responsiveness to the electric field, in the liquid crystal polymer 31, is lower than the responsiveness to the electric field, in the liquid crystal molecules 32.

The example illustrated in FIG. 4A corresponds to a state in which no voltage is applied to the liquid crystal layer 30 (for example, a state in which a potential difference between the pixel electrode 11 and the common electrode 21 is zero) or a state in which a second transparent voltage explained below is applied to the liquid crystal layer 30.

As shown in FIG. 4A, an optical axis Ax1 of the liquid crystal polymer 31 and an optical axis Ax2 of the liquid crystal molecules 32 are parallel to each other. In the example illustrated, each of the optical axis Ax1 and the optical axis Ax2 is parallel to the third direction Z. The optical axis corresponds to a line parallel to a direction of travel of the light beam in which the refractive indexes indicate one value irrespective of the direction of polarization.

Since, as explained above, the liquid crystal polymer 31 and the liquid crystal molecules 32 have approximately equivalent refractive anisotropy and the optical axes Ax1 and Ax2 are parallel to each other, the liquid crystal polymer 31 and the liquid crystal molecules 32 hardly have the refractive index difference in all of the directions including the first direction X, the second direction Y, and the third direction Z. For this reason, a light beam L1 incidents on the liquid crystal layer 30 in the third direction Z are transmitted without being substantially scattered in the liquid crystal layer 30. The liquid crystal layer 30 can maintain the parallelism of the light beam L1. Similarly, a light beam L2 and a light beam L3 incident in a direction oblique with respect to the third direction Z are hardly scattered in the liquid crystal layer 30, either. For this reason, high transparency can be obtained. The state illustrated in FIG. 4A is called a transparent state.

Figure 4B:
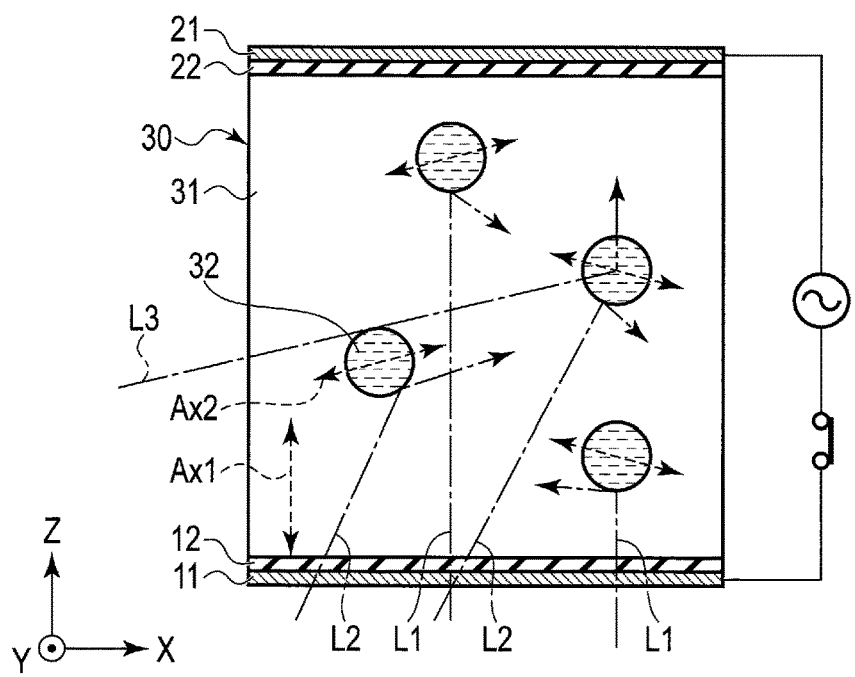
FIG. 4B is an illustration schematically showing the liquid crystal layer in a scattering state.

FIG. 4B is an illustration schematically showing the liquid crystal layer 30 in a scattering state.

As shown in FIG. 4B, the responsiveness to the electric field, in the polymer 31, is lower than the responsiveness to the electric field, in the liquid crystal molecules 32. For this reason, in a state in which a voltage (scattering voltage as explained below) higher than each of the second transparent voltage and a first transparent voltage as explained below is applied to the liquid crystal layer 30, the direction of alignment of the liquid crystal molecules 32 is changed in accordance with the electric field since the direction of alignment of the liquid crystal polymer 31 is hardly changed. In other words, as illustrated in the drawing, the optical axis Ax1 is substantially parallel to the third direction Z while the optical axis Ax2 is oblique to the third direction Z. For this reason, the optical axis Ax1 and optical axis Ax2 intersect each other. A large refractive index difference is therefore generated between the liquid crystal polymer 31 and the liquid crystal molecules 32 in all of the directions including the first direction X, the second direction Y, and the third direction Z. The light beams L1 to L3 incident on the liquid crystal layer 30 are thereby scattered in the liquid crystal layer 30. The state shown in FIG. 4B is called a scattering state.

The control unit changes the state of the liquid crystal layer 30 to at least one of the transparent state and/or the scattering state.

Figure 5A:
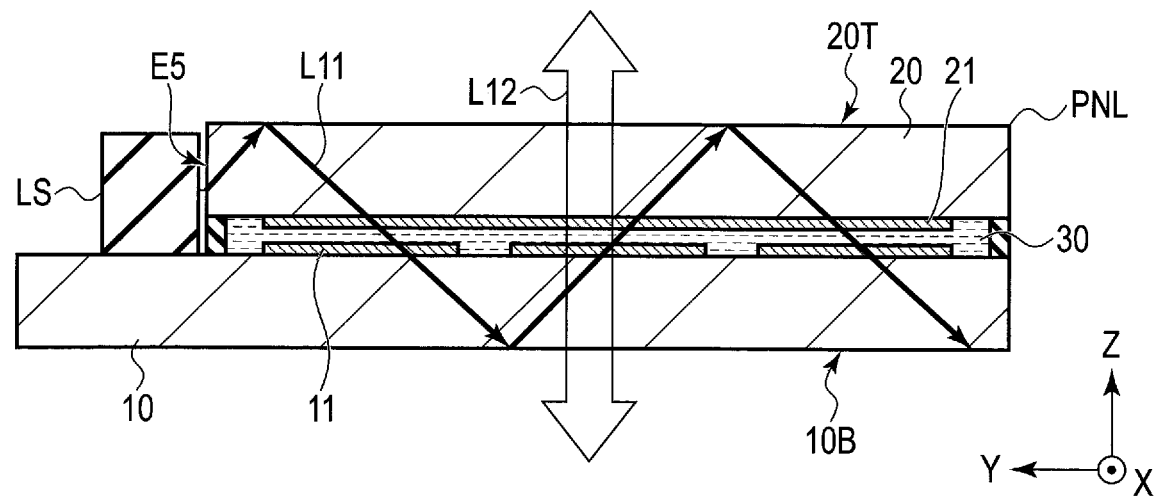
FIG. 5A is a cross-sectional view showing the display panel in a case where the liquid crystal layer is in the transparent state.

FIG. 5A is a cross-sectional view showing the display panel PNL in a case where the liquid crystal layer 30 is in a transparent state.

As shown in FIG. 5A, an illumination light beam L11 emitted from the light-emitting element LS is made incident on the display panel PNL from the end portion E5 to propagate through the transparent substrate 20, the liquid crystal layer 30, the transparent substrate 10, and the like. If the liquid crystal layer 30 is in the transparent state, the light beam L11 is hardly scattered in the liquid crystal layer 30, and hardly leaks from a lower surface 10B of the transparent substrate 10 and an upper surface 20T of the transparent substrate 20.

An external light L12 incident on the display panel PNL is transmitted and hardly scattered in the liquid crystal layer 30. In other words, the external light incident on the display panel PNL from the lower surface 10B is transmitted through the upper surface 20T, and the external light incident from the upper surface 20T is transmitted through the lower surface 10B. For this reason, the user can visually recognize a background on the lower surface 10B side through the display panel PNL when the display panel PNL is observed from the upper surface 20T side. Similarly, the user can visually recognize a background on the upper surface 20T side through the display panel PNL when the display panel PNL is observed from the lower surface 10B side.

Figure 5B:
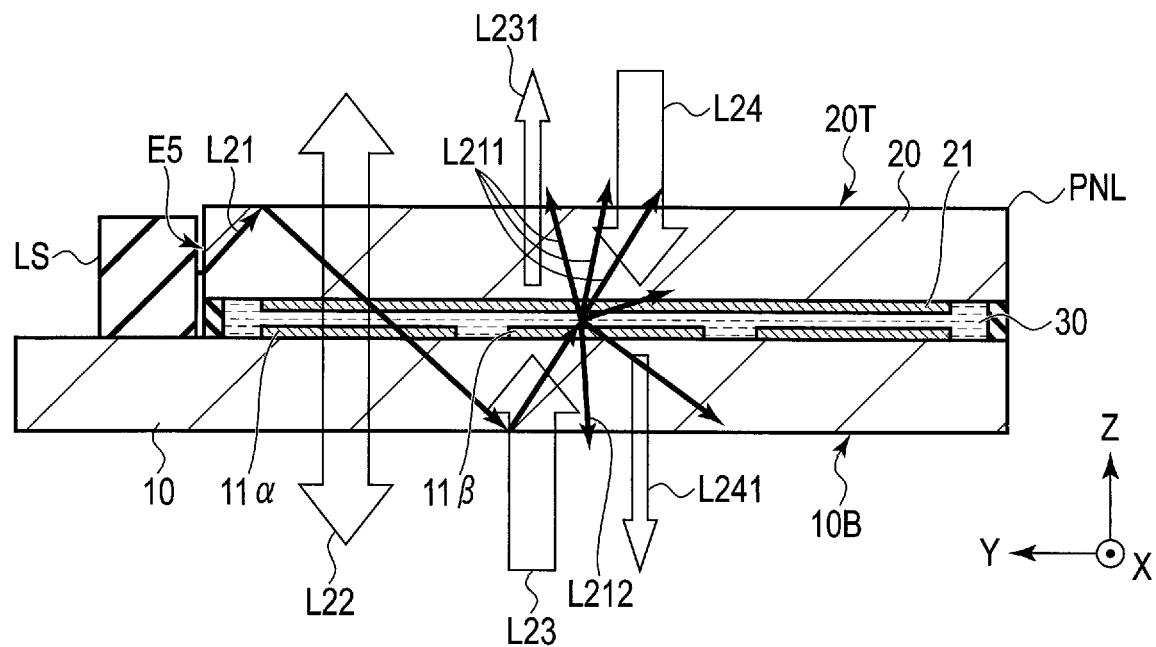
FIG. 5B is a cross-sectional view showing the display panel in a case where the liquid crystal layer is in the scattering state.

FIG. 5B is a cross-sectional view showing the display panel PNL in a case where the liquid crystal layer 30 is in the scattering state.

As shown in FIG. 5B, an illumination light beam L21 emitted from the light-emitting element LS is made incident on the display panel PNL from the end portion E5 to propagate through the transparent substrate 20, the liquid crystal layer 30, the transparent substrate 10, and the like. In the example illustrated, since the liquid crystal layer 30 between a pixel electrode 11α and the common electrode 21 (i.e., a liquid crystal layer to which a voltage applied between the pixel electrode 11α and the common electrode 21) is applied is in a transparent state, the illumination light beam L21 is hardly scattered in a region opposed to the pixel electrode 11α, in the liquid crystal layer 30. In contrast, since the liquid crystal layer 30 between a pixel electrode 11β and the common electrode 21 (i.e., a liquid crystal layer to which a voltage applied between the pixel electrode 11β and the common electrode 21) is applied is in the scattering state, the illumination light beam L21 is scattered in a region opposed to the pixel electrode 11β, in the liquid crystal layer 30. Of the illumination light beam L21, a scattered light beam L211 is emitted to the outside from the upper surface 20T, and a scattered light beam L212 is emitted to the outside from the lower surface 10B.

At a position which overlaps the pixel electrode 11a, an external light L22 incident on the display panel PNL is transmitted and hardly scattered in the liquid crystal layer 30, similarly to the external light L12 shown in FIG. 5A. At a position which overlaps the pixel electrode 11β, light L231 that is part of an external light beam L23 incident from the lower surface 10B is scattered in the liquid crystal layer 30 and then transmitted through the upper surface 20T. In addition, light L241 that is part of an external light L24 incident from the upper surface 20T is scattered in the liquid crystal layer 30 and then transmitted through the lower surface 10B.

For this reason, a color of the illumination light beam L21 can be visually recognized at a position which overlaps the pixel electrode 11β when observing the display panel PNL from the upper surface 20T side. In addition, since the external light L231 that is part of the external light L23 is transmitted through the display panel PNL, the background on the lower surface 10B side can also be visually recognized through the display panel PNL. Similarly, a color of the illumination light beam L21 can be visually recognized at a position which overlaps the pixel electrode 11β when observing the display panel PNL from the lower surface 10B side. In addition, since the external light L241 that is part of the external light L24 is transmitted through the display panel PNL, the background on the upper surface 20T side can also be visually recognized through the display panel PNL. At a position which overlaps the pixel electrode 11α, the color of the illumination light beam L21 can hardly be recognized visually and the background can be visually recognized through the display panel PNL since the liquid crystal layer 30 is in the transparent state.

FIG. 6 is a graph showing the scattering characteristic of the liquid crystal layer 30, indicating a relationship between the luminance and a voltage VLC applied to the liquid crystal layer 30. The luminance corresponds to luminance of scattered light beam L211 obtained when the illumination light beam L21 emitted from the light-emitting element LS is scattered in the liquid crystal layer 30 as shown in, for example, FIG. 5B. This luminance represents a scattering degree of the liquid crystal layer 30 from the other viewpoint.

As shown in FIG. 6, if the voltage VLC is increased from 0V, the luminance is steeply increased from approximately 8V and saturated at approximately 20V. The luminance is slightly increased even if the voltage VLC is in a range from 0V to 8V. In the present embodiment, an area surrounded by a two-dot-chained line, i.e., a voltage in a range from 8V to 16V is used for reproduction of gradation (for example, 256 gradation) of each pixel PX. The voltage in a range 8V<VLC≤16V is hereinafter called a scattering voltage. In addition, in the present embodiment, the area surrounded by one-dot-chained line, i.e., the voltage in a range 0V≤VLC≤8V is called a transparent voltage. A transparent voltage VA includes the first transparent voltage VA1 and second transparent voltage VA2 explained above. The lower limit and the upper limit of the scattering voltage VB and the transparent voltage VA are not limited to this example but can arbitrarily be determined in accordance with the scattering property of the liquid crystal layer 30.

If the degree of scattering of the light incident on the liquid crystal layer 30 is the highest when the scattering voltage VB is applied to the liquid crystal layer 30, the degree of scattering is assumed to be 100%. The degree of scattering in a case of applying the scattering voltage VB of 16V to the liquid crystal layer 30 is assumed to be 100%. For example, the transparent voltage VA can be defined as a voltage in a range of the voltage VLC where the degree of scattering (luminance) is less than 10%. Alternatively, the transparent voltage VA can also be defined as the voltage VLC lower than or equal to a voltage (8V in the example of FIG. 6) corresponding to the lowest gradation.

In addition, the transparent voltage VA (first transparent voltage VA1 and second transparent voltage VA2) may be different from the example shown in FIG. 6. For example, the first transparent voltage VA1 may be a voltage in which the degree of scattering is in a range higher than or equal to 10% and lower than or equal to 50%. In addition, the second transparent voltage VA2 may be a voltage in which the degree of scattering is in a range lower than 10%.

The graph shown in FIG. 6 is applicable to a case where the polarity of the voltage applied to the liquid crystal layer 30 is positive polarity (+) and negative polarity (−). In the latter case, the voltage VLC is an absolute value of the negative-polarity voltage.

Figure 7B:
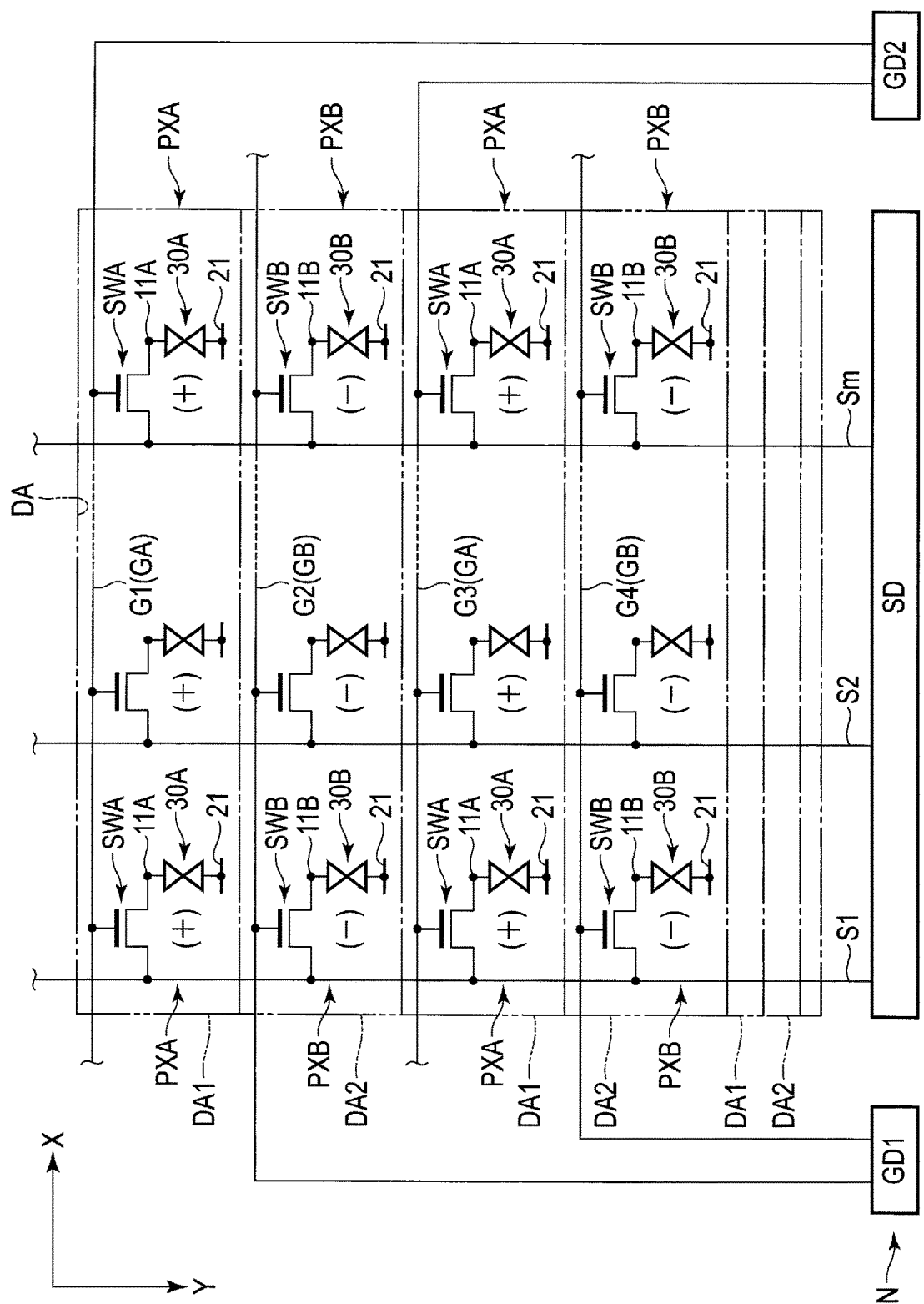
FIG. 7B is a diagram showing a summary of the one-line-inversion drive scheme, illustrating a state in which a positive-polarity drive voltage is applied to the first liquid crystal layer and the negative-polarity drive voltage is applied to the second liquid crystal layer.

The display device DSP can be applied to polarity inversion drive of inverting the polarity of the voltage applied to the liquid crystal layer 30. FIG. 7A and FIG. 7B show a summary of the polarity inversion drive. FIG. 7A and FIG. 7B show one-line inversion drive of inverting the positive polarity (+) and the negative polarity (−) of the drive voltage applied to the liquid crystal layer 30 (i.e., the voltage written to the pixel PX) in each group of pixels PX (one line) connected to one scanning line G.

As shown in FIG. 7A, the display area DA includes first drive areas DA1 elongated in the first direction X and second drive areas DA2 elongated in the first direction X. The first drive areas DA1 and the second drive areas DA2 are alternately disposed in the second direction Y. The pixels PX for one row are disposed in each of the first drive areas DA1 and each of the second drive areas DA2. First pixels PXA, of the pixels PX, are disposed in the first drive areas DA1 and second pixels PXB are disposed in the second drive areas DA2.

In the present embodiment, the first drive areas DA1 are located at odd-numbered positions from the upper side (scanning line G4 side from the scanning line G1), and the second drive areas DA2 are located at even-numbered positions. Unlike the present embodiment, however, the first drive areas DA1 may be located at even-numbered positions and the second drive areas DA2 may be located at odd-numbered positions.

The scanning lines G include first scanning lines GA and second scanning lines GB. The first scanning lines GA and the second scanning lines GB are alternately disposed in the second direction Y.

The pixel electrodes 11 include first pixel electrodes 11A and second pixel electrodes 11B. The first pixel electrodes 11A for one row are located in each of the first drive areas DA1, electrically connected to one of the first scanning lines GA, and arranged in the first direction X. The second pixel electrodes 11B for one row are located in each of the second drive areas DA2, electrically connected to one of the second scanning lines GB, and arranged in the first direction X.

The switching elements SW include first switching elements SWA and second switching elements SWB. In the present embodiment, the first switching elements SWA are first thin-film transistors, and the second switching elements SWB are second thin-film transistors. Each of the first switching elements SWA comprises a gate electrode connected to one corresponding first scanning line GA, a source electrode connected to one corresponding first pixel electrode 11A, and a drain electrode connected to one corresponding signal line S. Each of the second switching elements SWB comprises a gate electrode connected to one corresponding second scanning line GB, a source electrode connected to one corresponding second pixel electrode 11B, and a drain electrode connected to one corresponding signal line S.

The liquid crystal layer 30 includes first liquid crystal layers 30A serving as first display function layers and second liquid crystal layers 30B serving as second display function layers. The first liquid crystal layers 30A are located in the first drive areas DA1 and the second liquid crystal layers 30B are located in the second drive areas DA2.

Figure 8A:
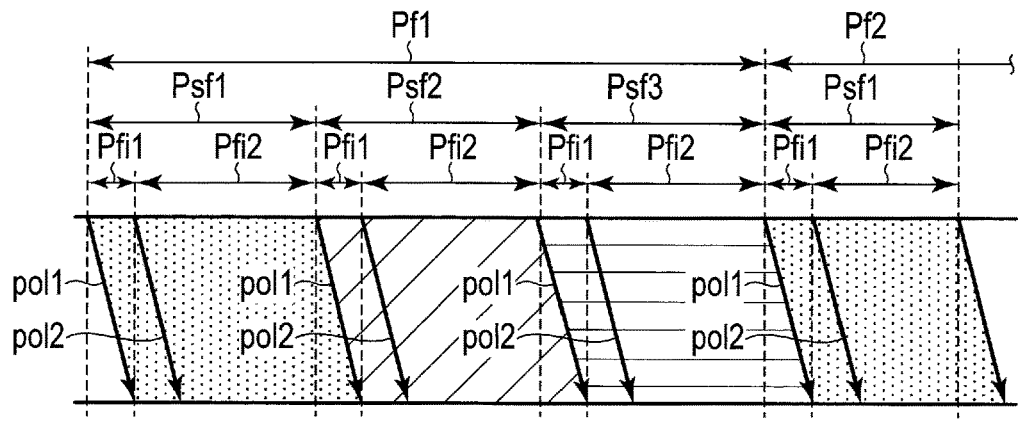
FIG. 8A is a timing chart showing a display operation, for explanation of example 1 of a first driving method performed by a control unit shown in FIG. 1.
Figure 8B:
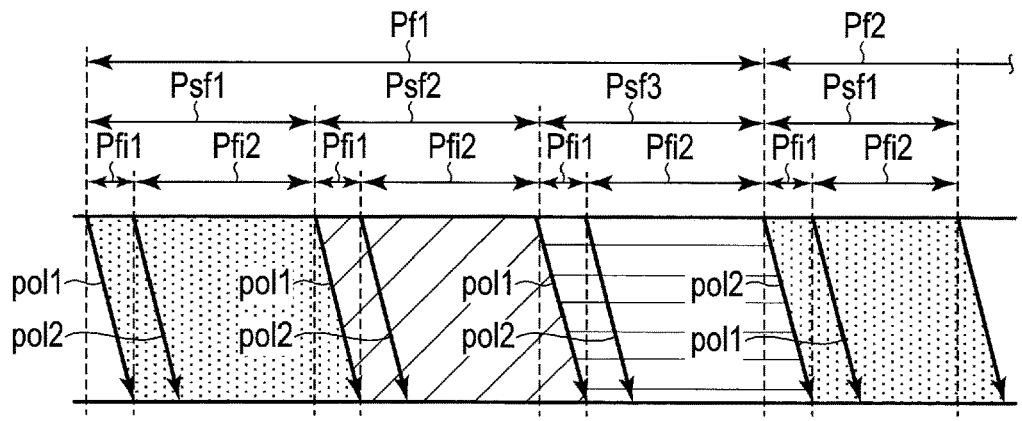
FIG. 8B is a timing chart showing a display operation, for explanation of example 2 of the first driving method performed by the control unit.
Figure 8C:
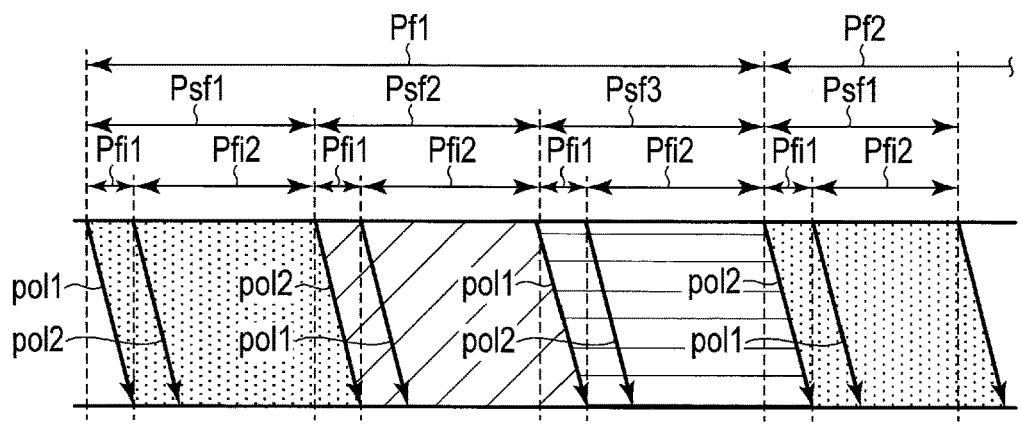
FIG. 8C is a timing chart showing a display operation, for explanation of example 3 of the first driving method performed by the control unit.

It is assumed that as shown in FIG. 8A, FIG. 8B, and FIG. 8C, a first frame period Pf1 includes three sub-frame periods Psf and each of the sub-frame periods includes two field periods Pfi. Three sub-frame periods mentioned above are a first sub-frame period Psf1, a second sub-frame period Psf2 subsequent to the first sub-frame period, and a third sub-frame period Psf3 subsequent to the second sub-frame period. Two field periods mentioned above are a first field period Pfi1 and a second field period Pfi2 following the first field period.

For example, the polarity of the common voltage supplied to the common electrode 21 and the polarity of the video signal (i.e., the polarity of the signal line voltage) supplied from the source driver SD to the signal line S are inverted in each field period. In the same field period, for example, the polarity of the common voltage and the polarity of the video signal are opposite to each other.

Next, a driving method of the control unit CON will be explained.

First, a first driving method of the control unit CON will be explained.

The control unit CON changes a drive target in each field period. For example, the control unit CON applies the drive voltage to the first liquid crystal layers 30A and does not apply the drive voltage to the second liquid crystal layers 30B, in a first field period of the first sub-frame period. The control unit CON applies the drive voltage to the second liquid crystal layers 30B, in a second field period of the first sub-frame period. In each of the sub-frame periods of the first sub-frame period, the polarity of the drive voltage in the first field period is different from that in the second field period.

In the example shown in FIG. 8A, the control unit CON applies the drive voltage of first polarity pol1 to either the first liquid crystal layers 30A or the second liquid crystal layers 30B, in the first field period Pfi1 of each sub-frame period Psf. Then, the control unit CON applies the drive voltage of second polarity pol2 to the others of the first liquid crystal layers 30A and the second liquid crystal layers 30B, in the second field period Pfi2 of each sub-frame period Psf.

However, the polarities of the drive voltages in each field period Pfi may not be fixed.

As shown in FIG. 8B, for example, every time the frame period Pf is changed the polarity of the drive voltage in the first field period Pfi1 and the polarity of the drive voltage in the second field period Pfi2 may be replaced.

Alternatively, as shown in FIG. 8C, every time the sub-frame periods Psf are changed the polarity of the drive voltage in the first field period Pfi1 and the polarity of the drive voltage in the second field period Pfi2 may be replaced.

One of the first polarity pol1 and the second polarity pol2 is the positive polarity while the other is the negative polarity.

Next, a second driving method of the control unit CON will be explained as a driving method more detailed than the first driving method.

The control unit CON applies the negative-polarity drive voltage to either the first liquid crystal layers 30A or the second liquid crystal layers 30B, in the first field period of each of the sub-frame periods. Then, the control unit CON applies the positive-polarity drive voltage to the others of the first liquid crystal layers 30A and the second liquid crystal layers 30B, in the second field period in each of the sub-frame periods.

The second driving method corresponds to the case where the first polarity pol1 is negative polarity and the second polarity pol1 is positive polarity in FIG. 8A.

In the examples shown in FIG. 7A and FIG. 8A, the control unit CON applies the negative-polarity drive voltage to the first liquid crystal layers 30A in the first field periods Pfi1, and applies the positive-polarity drive voltage to the second liquid crystal layers 30B in the second field periods Pfi2. In this case, the first field periods Pfi1 are odd-numbered field periods, and the second field periods Pfi2 are even-numbered field periods.

In the examples shown in FIG. 7B and FIG. 8A, the control unit CON applies the negative-polarity drive voltage to the second liquid crystal layers 30B in the first field periods Pfi1, and applies the positive-polarity drive voltage to the first liquid crystal layers 30A in the second field periods Pfi2. In this case, the first field periods Pfi1 are even-numbered field periods, and the second field periods Pfi2 are odd-numbered field periods.

Next, a third driving method of the control unit CON will be explained as a driving method more detailed than the second driving method.

The control unit CON fixes targets to which the negative-polarity drive voltage is applied in the first field period to either the first liquid crystal layers 30A or the second liquid crystal layers 30B in the first frame period. In addition, the control unit CON fixes targets to which the positive-polarity drive voltage is applied in the second field period to the others of the first liquid crystal layers 30A and the second liquid crystal layers 30B in the first frame period. Then, the control unit CON replaces the targets to which the negative-polarity drive voltage is applied in the first field period and the targets to which the positive-polarity drive voltage is applied in the second field period every time the frame periods are changed.

As shown in FIG. 7A and FIG. 9, the control unit CON fixes the targets to which the negative-polarity drive voltage is applied in the first field periods Pfi1 to the first liquid crystal layers 30A and fixes the targets to which the positive-polarity drive voltage is applied in the second field periods Pfi2 to the second liquid crystal layers 30B, in the odd-numbered frame period Pf including the first frame period Pf1.

As shown in FIG. 7B and FIG. 9, the control unit CON fixes the targets to which the negative-polarity drive voltage is applied in the first field periods Pfi1 to the second liquid crystal layers 30B and fixes the targets to which the positive-polarity drive voltage is applied in the second field periods Pfi2 to the first liquid crystal layers 30A, in the even-numbered frame period Pf.

Next, a fourth driving method of the control unit CON will be explained as the other driving method more detailed than the second driving method.

The control unit CON changes the targets to which the negative-polarity drive voltage is applied in the first field period to either the first liquid crystal layers 30A or the second liquid crystal layers 30B every time the sub-frame periods are changed. In addition, the control unit CON changes the targets to which the positive-polarity drive voltage is applied in the second field period to the others of the first liquid crystal layers 30A and the second liquid crystal layers 30B every time the sub-frame periods are changed.

As shown in FIG. 7A and FIG. 10, for example, the control unit CON sets the targets to which the negative-polarity drive voltage is applied in the first field period Pfi1 to the first liquid crystal layers 30A and sets the targets to which the positive-polarity drive voltage is applied in the second field period Pfi2 to the second liquid crystal layers 30B, in the first sub-frame period Psf1 of the first frame period Pf1.

Subsequently, as shown in FIG. 7B and FIG. 10, for example, the control unit CON changes the targets to which the negative-polarity drive voltage is applied in the first field period Pfi1 to the second liquid crystal layers 30B and changes the targets to which the positive-polarity drive voltage is applied in the second field period Pfi1 to the first liquid crystal layers 30A, in the second sub-frame period Psf2 of the first frame period Pf1.

Subsequently, as shown in FIG. 7A and FIG. 10, the control unit CON changes the targets to which the negative-polarity drive voltage is applied in the first field period Pfi1 to the first liquid crystal layers 30A and changes the targets to which the positive-polarity drive voltage is applied in the second field period Pfi2 to the second liquid crystal layers 30B, in the third sub-frame period Psf3 of the first frame period Pf1.

After that, as shown in FIG. 7B and FIG. 10, for example, the control unit CON changes the targets to which the negative-polarity drive voltage is applied in the first field period Pfi1 to the second liquid crystal layers 30B and changes the targets to which the positive-polarity drive voltage is applied in the second field period Pfi2 to the first liquid crystal layers 30A, in the first sub-frame periods Psf1 of the second frame period Pf2 following the first frame period Pf1.

Figure 11A:
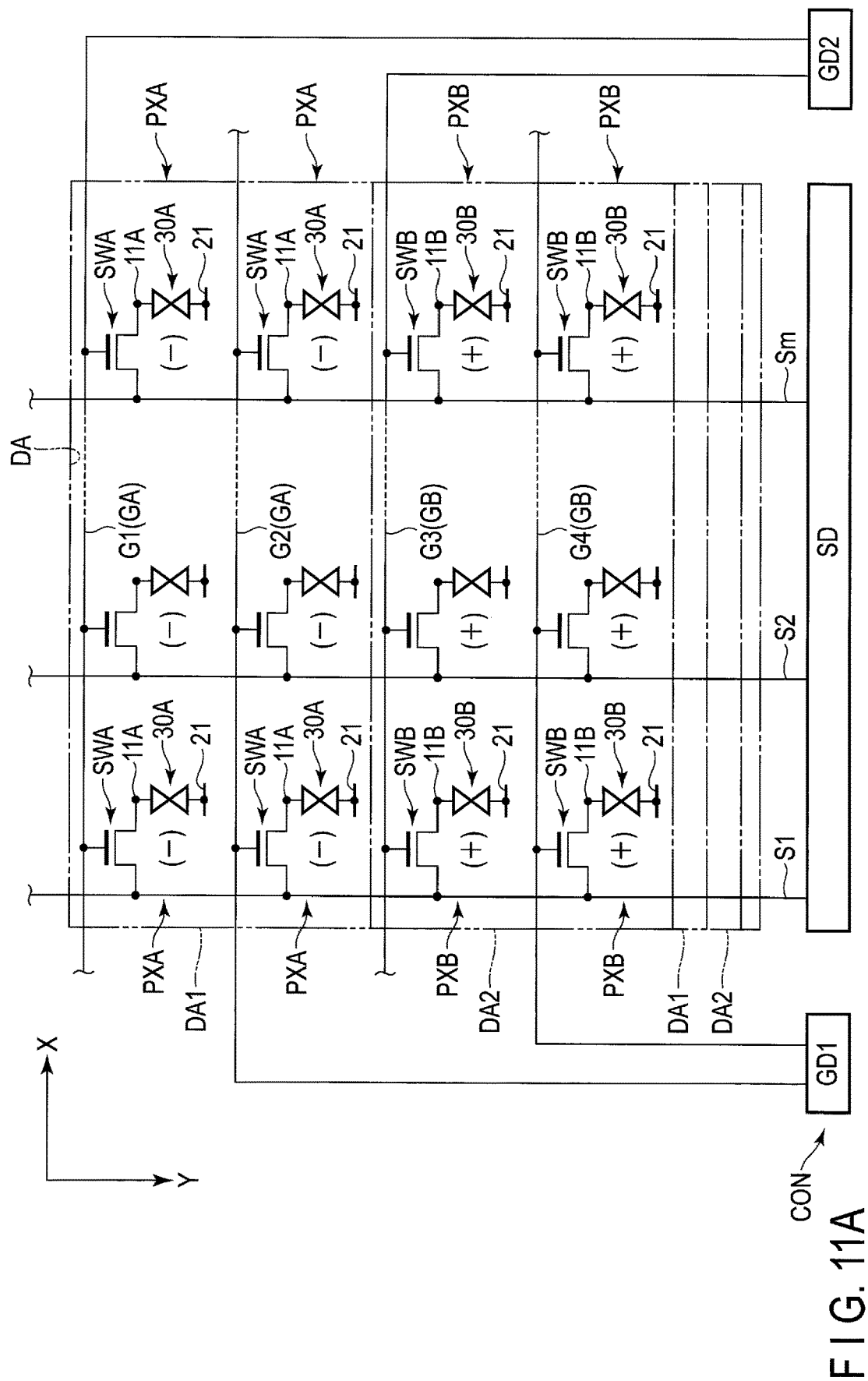
FIG. 11A is a diagram showing a summary of two-line-inversion drive scheme, illustrating a state in which a negative-polarity drive voltage is applied to the first liquid crystal layer and a positive-polarity drive voltage is applied to the second liquid crystal layer.
Figure 11B:
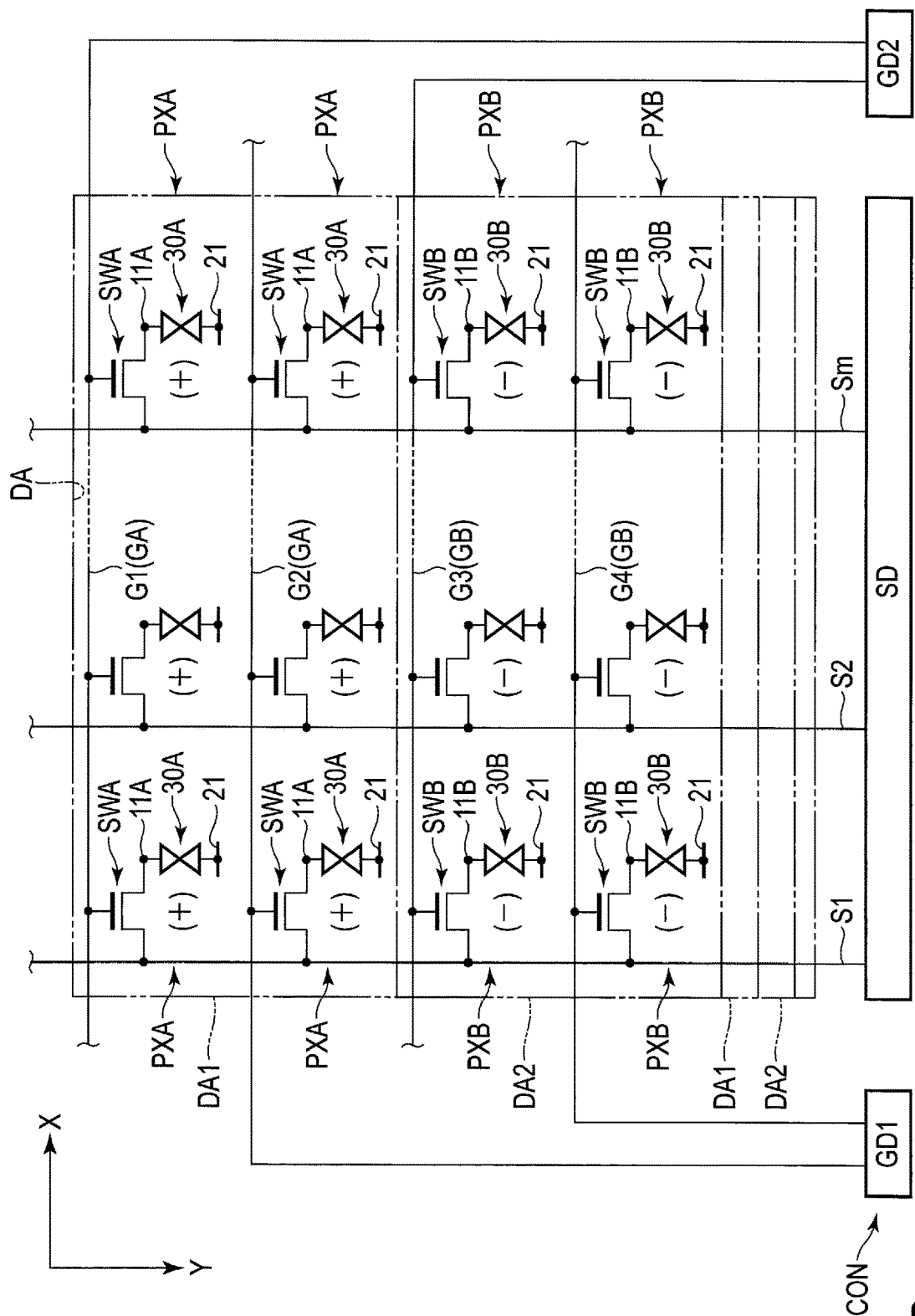
FIG. 11B is a diagram showing a summary of the two-line-inversion drive scheme, illustrating a state in which a positive-polarity drive voltage is applied to the first liquid crystal layer and the negative-polarity drive voltage is applied to the second liquid crystal layer.

Next, a driving method different from the driving method shown in FIG. 7A and FIG. 7B will be explained. FIG. 11A and FIG. 11B show a summary of the other polarity inversion drive. FIG. 11A and FIG. 11B show two-line inversion drive of inverting the positive polarity (+) and the negative polarity (−) of the voltage applied to the liquid crystal layer 30 in every two lines.

As shown in FIG. 11A and FIG. 11B, the pixels PX for two rows may be disposed in each of the first drive areas DA1 and each of the second drive areas DA2. The control unit CON can execute two-line inversion drive using the above-explained first to fourth driving methods.

Alternatively, the control unit CON may drive the voltage applied to the liquid crystal layer 30 so as to invert the positive polarity (+) and the negative polarity (−) in every three or more rows. In this case, the pixels PX for three or more rows may be disposed in each of the first drive areas DA1 and each of the second drive areas DA2. In any case, occurrence of flicker can be suppressed by alternately disposing the first drive areas DA1 and the second drive areas DA2.

However, since the first drive areas DA1 and the second drive areas DA2 are different in drive conditions, it is undesirable that the size of the first drive areas DA1 and the second drive areas DA2 is so much large. This is because when the user visually recognizes the display area DA the patterns of the first drive areas DA1 and the second drive areas DA2 can easily be identified.

FIG. 12 is a chart showing examples of the common voltage Vcom supplied to the common electrode 21 and the signal line voltage Vsig supplied to the signal line S (or the pixel electrode 11) in the display scanning employing the above-explained field inversion drive. In the present specification, each of the voltage values is a substantial voltage value.

As shown in FIG. 12, a waveform corresponding to a maximum value (max) of gradation and a waveform corresponding to a minimum value (min) of gradation are illustrated with respect to the signal line voltage Vsig. The waveform of the signal line voltage Vsig (min) is represented by a solid line, the waveform of the common voltage Vcom is represented by a two-dot-chained line, and the waveform of the signal line voltage Vsig (max) is represented by a dashed line. In the examples illustrated, polarities of the common voltage Vcom and the signal line voltage Vsig (see the waveform of the maximum value) are inverted in each field period Pfi. Reference voltage Vsig-c is, for example, 8V. The lower limit is 0V and the upper limit is 16V in each of the common voltage Vcom and the signal line voltage Vsig.

When attention is focused on the polarity inversion drive including not only the example shown in FIG. 12 but an example shown in FIG. 13 to be explained below, a difference (Vsig-Vcom) between the signal line voltage Vsig and the common voltage Vcom is 0V or a positive voltage value if the drive voltage applied to the liquid crystal layer 30 (i.e., the voltage written to the pixel PX) is positive-polarity. In contrast, if the drive voltage applied to the liquid crystal layer 30 (i.e., the voltage written to the pixel PX) is negative-polarity, the difference (Vsig-Vcom) between the signal line voltage Vsig and the common voltage Vcom is 0V or a negative voltage value.

When attention is focused on polarity inversion drive shown in FIG. 12, the common voltage Vcom is 0V and the signal line voltage Vsig is a voltage value corresponding to the gradation indicated by the image data within a range higher than or equal to 8V and lower than or equal to 16V in a period where the positive-polarity voltage is written to the pixel PX. In contrast, the common voltage Vcom is 16V and the signal line voltage Vsig is a voltage value corresponding to the gradation indicated by the image data within a range higher than or equal to 0V and lower than or equal to 8V in a period where the negative-polarity voltage is written to the pixel PX. That is, in any case, the voltage higher than or equal to 8V and lower than or equal to 16V is applied between the common electrode 21 and the pixel electrode 11.

As shown in FIG. 6, even if the voltage VLC applied to the liquid crystal layer 30 is 8V or the first transparent voltage VA1 is applied to the liquid crystal layer 30, the liquid crystal layer 30 has the degree of scattering of approximately 0 to 10%. Therefore, even if the signal line voltage Vsig is the minimum value of the gradation, the external light incident on the display panel PNL is slightly scattered and the visibility of the background of the display panel PNL may be lowered.

For this reason, as explained below, the visibility of the background of the display panel PNL can be improved by applying the transparent scanning (scanning in a reset period to be explained below) of making the voltage between the pixel electrode 11 and the common electrode 21 smaller than the lower limit of gradation to the image display sequence.

A relationship between the common voltage Vcom and the output of the source driver SD will be explained.

If a withstand voltage of the source driver SD is low, the common voltage Vcom is inversely driven to increase the liquid crystal applied voltage. At this time, the source driver SD can output either of the positive-polarity signal line voltage Vsig (for example, reference voltage Vsig-c to 16V) and the negative-polarity signal line voltage Vsig (for example, 0V to reference voltage Vsig-c). In addition, the polarity of the common voltage Vcom is opposite to the polarity of the output of the source driver SD.

However, if the source driver SD of a high withstand voltage is used, the relationship between the signal line voltage Vsig and the common voltage Vcom may be the same as the above-explained relationship but may also be a relationship explained below. That is, the common voltage Vcom is fixed to 0V, and the signal line voltage Vsig output from the source driver SD is in a range between 0V and +16V at the positive polarity or range between −16V and 0V at the negative polarity.

FIG. 13 is a chart showing examples of the common voltage Vcom and the signal line voltage Vsig in the transparent scanning. The waveform of the signal line voltage Vsig is represented by a solid line, and the waveform of the common voltage Vcom is represented by a two-dot-chained line.

As shown in FIG. 13, the common voltage Vcom is changed alternately to 0V and 16V in each field period Pfi, similarly to the example shown in FIG. 12. In the transparent scanning, the signal line voltage Vsig matches the common voltage Vcom (Vsig=Vcom=0V or Vsig=Vcom=16V) in each field period Pfi. In FIG. 13, the signal line voltage Vsig and the common voltage Vcom are slightly shifted in consideration of the illustrated relationship between the voltages. For this reason, the voltage of 0V is applied to the liquid crystal layer 30. In other words, the second transparent voltage VA2 is applied to the liquid crystal layer 30.

However, the signal line voltage Vsig in the transparent scanning is not limited to the example shown in FIG. 12. For example, the signal line voltage Vsig may be higher than 0V and less than 8V (0V<Vsig<8V) in a period when the common voltage Vcom is 0V. The signal line voltage Vsig may be higher than 8V and less than 16V (8V<Vsig<16V) in a period when the common voltage Vcom is 16V. In any case, according to the transparent scanning, an absolute value of the difference between the signal line voltage Vsig and the common voltage Vcom is less than 8V and the parallelism of the light transmitted through the liquid crystal layer 30 is increased. In other words, the second transparent voltage VA2 is not limited to 0V but an absolute value of the second transparent voltage VA2 may be less than 8V.

In the transparent scanning, the voltage applied to the liquid crystal layer 30 needs only to be less than the lower limit of gradation (for example, 8V), and the signal line voltage Vsig may not completely match the common voltage Vcom. As explained above, if the degree of scattering of the light incident on the liquid crystal layer 30 is the highest when the scattering voltage VB is applied to the liquid crystal layer 30, the degree of scattering is assumed to be 100%. It is desirable that, for example, the second transparent voltage VA2 is a voltage in which the degree of scattering is in a range lower than 10%.

FIG. 14 is a chart showing the other examples of the common voltage Vcom and the signal line voltage Vsig in the transparent scanning. The waveform of the signal line voltage Vsig (min) is represented by a solid line, and the waveform of the common voltage Vcom is represented by a two-dot-chained line.

As shown in FIG. 14, in this example, the polarity inversion of the common voltage Vcom and the signal line voltage Vsig is stopped in the transparent scanning. Furthermore, the common voltage Vcom and the signal line voltage Vsig match at 8V (above-explained reference voltage Vsig-c). The common voltage Vcom and the signal line voltage Vsig may match at a voltage other than the reference voltage Vsig-c, such as 0V. In addition, it is desirable that the second transparent voltage VA2 is a voltage in which the degree of scattering is in a range lower than 10%, similarly to the case shown in FIG. 13.

FIG. 15 is a graph showing a variation in a current Ids flowing between a drain electrode and a source electrode of the switching element SW showing in FIG. 7A and the like, to a voltage Vgs applied between a gate electrode and the source electrode of the switching element SW. In the switching element SW, the gate electrode is connected to the scanning line G, the source electrode is connected to the pixel electrode 11, and the drain electrode is connected to the signal line S (FIG. 7A).

As shown in FIG. 15, as a result of simulating the properties of the switching element SW, it can be understood that when the switching element SW is turned off, even if the voltage Vgs is changed from a positive value to 0V, −1V or −2V, the electric resistance of the switching element SW cannot be sufficiently increased and the value of the current Ids cannot be sufficiently minimized. For this reason, it is desirable that an absolute value of the negative voltage Vgs exceeds 2V.

However, it can be recognized that the value of the current Ids is not smaller as the absolute value of the negative voltage Vgs becomes larger. In the graph illustrated, the value of the current Ids becomes smallest when the voltage Vgs is close to −4V, i.e., the reference voltage. The value of the current Ids becomes larger as the absolute value of the negative voltage Vgs is larger than the absolute value of the reference voltage. Based on the above, it is desirable that when the switching element SW is turned off, the absolute value of the negative voltage Vgs should not be so much larger to suppress the increase in value of the current Ids as leak current. For example, the absolute value of the negative voltage Vgs is desirably as close to 3V to 10V as possible. Therefore, it is desirable that the absolute value of the negative voltage Vgs is 37V rather than 53V. The absolute value of the negative voltage Vgs will be explained below.

Next, potential variation of one pixel PX in sequential first and second field periods will be explained.

Figure 16:
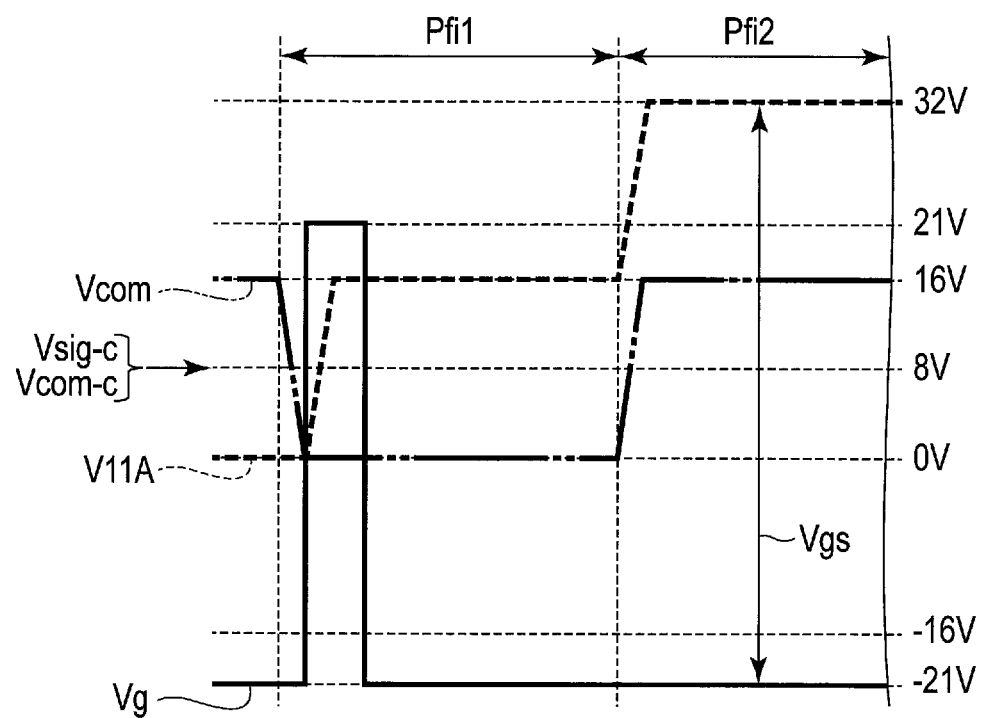
FIG. 16 is another timing chart showing variations in a pixel electrode potential, a common voltage, and a scanning signal voltage in a first field period and a second field period.

FIG. 16 is another timing chart showing variations in the potential V11 of the pixel electrode 11, the common voltage Vcom, and the voltage of the scanning signal Vg obtained when the positive-polarity voltage (positive-polarity drive voltage) is applied to the pixel PX (liquid crystal layer 30) in the first field period Pfi1 and the positive-polarity voltage is held in the pixel PX in the second field period Pfi2. In FIG. 16, the voltage value is an example and can be adjusted to the other value. In addition, if writing the signal line voltage Vsig to the pixel electrode 11 is insufficient, the waveform of the electric potential V11 can be modified from the waveform shown in FIG. 16.

Applying the driving shown in FIG. 16 to the driving of the first pixel PXA (first liquid crystal layer 30A) connected to the scanning line G1 and the signal line S1 in FIG. 7B will be explained. The first pixel PXA connected to the scanning line G1 will be explained as a representative example of the first pixel PXA connected to the odd-numbered scanning line G(j) and the second pixel PXB connected to the even-numbered scanning line G(j+1). The first field period Pfi1 is the odd-numbered field period, and the second field period Pfi2 is the even-numbered field period.

As shown in FIG. 16 and FIG. 7B, the Vcom circuit VC shown in FIG. 3 changes the common voltage Vcom supplied to the common electrode 21 from +16V to 0V and changes the signal line voltage Vsig from 0V to 16V, in the first field period Pfi1. Subsequently, the gate driver GD2 changes the voltage of the scanning signal Vg supplied to the scanning line G1 from −21V to +21V, turns on the first switching element SWA, and applies the signal line voltage Vsig of +16V to the first pixel electrodes 11A. The electric potential V11A of the first pixel electrodes 11A is thereby adjusted to, for example, +16V.

After that, to turn off the first switching elements SWA, the gate driver GD2 changes the voltage of the scanning signal Vg supplied to the scanning line G1 from +21V to −21V. The electric potential V11A of the first pixel electrodes 11A is thereby held at, for example, +16V.

Next, when the first field period Pfi1 is shifted to the second field period Pfi2, the gate driver GD2 maintains the voltage of the scanning signal Vg supplied to the scanning line G1 at −21V, and the Vcom circuit VC shown in FIG. 3 changes the common voltage Vcom supplied to the common electrode 21 from 0V to +16V. Then, the electric potential V11A of the first pixel electrode 11A is shifted to, for example, +32V by the coupling effect. In the second field period Pfi2, the voltage of the gate electrode of the first switching elements SWA is −53V (voltage Vgs=−53V) relative to the electric potential V11A of the electrode connected to the pixel. The switching element SW is explained as an N-type transistor and the electrode on the side connected to the pixel is explained as the source, but the electrode on the side connected to the pixel of the switching element SW may be the drain and the electrode on the side connected to the signal line S may be the source. In this case, in the switching element, a voltage Vgd=−53V can be represented. In addition, when the switching element is the P-type transistor, more leak current flows as the gate voltage is higher than the source voltage or the drain voltage and a difference between the gate voltage and the source voltage or the drain voltage is larger.

For this reason, suppressing the increase in the value of the leak current (current Ids in FIG. 15) flowing to the first switching elements SWA in the second field period Pfi2 is difficult. The method of holding the positive-polarity drive voltage applied to the first liquid crystal layer 30A in the first field period Pfi1, in the second field period Pfi2, by adopting the drive shown in FIG. 16 is undesirable. This is because decrease in the luminance (degree of scattering) of the first pixel PXA can easily be caused.

Next, potential variation of the first pixel PXA and potential variation of the second pixel PXB in sequential first and second sub-frame periods will be explained. An example of differentiating the polarities of the voltages written to the respective pixels PX in each sub-frame period Psf will be explained.

FIG. 17A is the other timing chart showing variations in an electric potential of the first pixel electrode 11A, the common voltage Vcom, and a voltage of a scanning signal Vg(j) in the first sub-frame period Psf1 and the second sub-frame period Psf2. In FIG. 17A, too, the voltage value can be adjusted to the other value, similarly to the case shown in FIG. 16, and the waveform of the electric potential V11A can be varied from the waveform shown in FIG. 17A.

Applying the driving shown in FIG. 17A to the driving of the first pixel PXA (first liquid crystal layer 30A) connected to the odd-numbered scanning line G(j) and the signal line S will be explained. Each of the first field period Pfi1 of the first sub-frame period Psf1 and the second field period Pfi2 of the second sub-frame period Psf2 is an odd-numbered field period. Each of the second field period Pfi2 of the first sub-frame period Psf1 and the first field period Pfi1 of the second sub-frame period Psf2 is an even-numbered field period.

As shown in FIG. 17A and FIG. 7A, the Vcom circuit VC shown in FIG. 3 changes the common voltage Vcom supplied to the common electrode 21 from 0V to +16V and changes the signal line voltage Vsig from 16V to 0V, in the first field period Pfi1 of the first sub-frame period Psf1. Subsequently, the gate driver GD2 changes the voltage of the scanning signal Vg(j) supplied to the scanning line G(j) from −21V to +21V, turns on the first switching element SWA, and applies the signal line voltage Vsig of 0V to the first pixel electrodes 11A. The electric potential V11A of the first pixel electrodes 11A is thereby adjusted to, for example, 0V.

After that, to turn off the first switching elements SWA, the gate driver GD2 changes the voltage of the scanning signal Vg(j) supplied to the scanning line G(j) from +21V to −21V. Thus, the first switching element SWA is turned off and the electric potential V11A of the first pixel electrodes 11A is held at 0V.

The negative-polarity voltage can be applied to the first pixel PXA (first liquid crystal layer 30A) in the first sub-frame period Psf1.

Next, when the first field period Pfi1 is shifted to the second field period Pfi2 in the first sub-frame period Psf1, the gate driver GD2 maintains the voltage of the scanning signal Vg(j) supplied to the scanning line G(j) at −21V, and the Vcom circuit VC shown in FIG. 3 changes the common voltage Vcom supplied to the common electrode 21 from +16V to 0V. Then, the electric potential V11A of the first pixel electrodes 11A is shifted to, for example, −16V by the coupling effect. In the second field period Pfi2, the voltage Vgs of the first switching element SWA becomes −5V. At this time, since the voltage of the electrode (source or drain) of the first switching element SWA connected to the signal line S is 16V, the gate voltage (Vgs or Vdg) to the electrode (source or drain) connected to the signal line S of the first switching element SWA is −37V. With reference to FIG. 15, the leak current of the switching element SW becomes smaller as the voltage Vgs (or Vgd) of the switching element SW is closer to approximately −3V to −10V. Therefore, the leak current is suppressed since the voltage Vgs (or Vgd) which is −37V is closer to approximately −3V to −10V than the voltage Vgs (or Vgd) of the first switching elements SWA which is −53V after the common voltage Vcom shown in FIG. 16 rises from 0V to 16V.

For this reason, increase in the value of the leak current (current Ids in FIG. 15) flowing to the first switching elements SWA can be suppressed in the second field period Pfi2. The method of holding the negative-polarity drive voltage applied to the first liquid crystal layer 30A in the first field period Pfi1 of the first sub-frame period Psf1, in the second field period Pfi2 of the first sub-frame period Psf1, by adopting the drive shown in FIG. 17A can contribute to, for example, suppression of decrease of the luminance (degree of scattering).

In addition, adopting the drive shown in FIG. 17A can contribute to low power consumption as compared with the line-inversion drive scheme.

After that, the control unit CON changes the state of the light source unit LU to the first state in a holding period Ph subsequent to the scanning period Ps of the second field period Pfi2 of the first sub-frame period Psf1. The first state indicates a state in which the light source unit LU emits light toward the liquid crystal layer 30. Then, the control unit CON changes the first state of the light source unit LU to the second state before the second field period Pfi2 of the first sub-frame period Psf1 ends. The second state indicates a state in which the light source unit LU suspends emitting light toward the liquid crystal layer 30.

Based on the above, the control unit CON turns on the corresponding light-emitting element LS and then turns off in the holding period Ph which is a period subsequent to the scanning period Ps in the first sub-frame period Psf1. The control unit CON can suppress the leak current flowing to the first switching element SWA in a period in which at least the light-emitting element LS is turned on.

Then, the targets to which the negative-polarity drive voltage is applied in the first field period Pfi1 and the targets to which the positive-polarity drive voltage is applied in the second field period Pfi2 are replaced every time the sub-frame periods Psf are changed. As explained below, the targets to which the negative-polarity drive voltage is applied in the first field period Pfi1 and the targets to which the positive-polarity drive voltage is applied in the second field period Pfi2 may be replaced every time the frame periods Pf are changed, unlike the example shown in FIG. 17A.

As shown in FIG. 17A and FIG. 7B, the off state of the first switching element SWA is maintained when the second field period Pfi2 of the first sub-frame period Psf1 is shifted to the first field period Pfi1 of the second sub-frame period Psf2, in this example. The Vcom circuit VC shown in FIG. 3 changes the common voltage Vcom supplied to the common electrode 21 from 0V to +16V. Then, the electric potential V11A of the first pixel electrode 11A is shifted to, for example, 0V by the coupling effect.

After that, when the first field period Pfi1 is shifted to the second field period Pfi2 of the second sub-frame period Psf2, the Vcom circuit VC shown in FIG. 3 changes the common voltage Vcom supplied to the common electrode 21 from +16V to 0V and changes the signal line voltage Vsig to +16V. Subsequently, the gate driver GD2 changes the voltage of the scanning signal Vg(j) supplied to the scanning line G(j) from −21V to +21V, turns on the first switching element SWA, and applies the signal line voltage Vsig of +16V to the first pixel electrodes 11A. The electric potential V11A of the first pixel electrodes 11A is thereby adjusted to, for example, 16V.

After that, to turn off the first switching elements SWA, the gate driver GD2 changes the voltage of the scanning signal Vg(j) supplied to the scanning line G(j) from +21V to −21V. Thus, the first switching element SWA is turned off and the electric potential V11A of the first pixel electrodes 11A is held at 16V.

The positive-polarity voltage can be applied to the first pixel PXA (first liquid crystal layer 30A) in the second sub-frame period Psf2. The timing of polarity inversion drive of the first pixel PXA (first liquid crystal layer 30A) comes after the corresponding light-emitting element LS is turned off. For this reason, degradation in display quality is not caused.

After that, the control unit CON changes the state of the light source unit LU to the first state in a holding period Ph subsequent to the scanning period Ps of the second field period Pfi2 of the second sub-frame period Psf2. Then, the control unit CON changes the first state of the light source unit LU to the second state before the second field period Pfi2 of the second sub-frame period Psf2 ends.

In the second field period Pfi2 of the second sub-frame period Psf2, the gate voltage of the first switching element SWA is −37V (Vgs or Vgd=−37V) relative to the electric potential V11A of the electrode connected to the pixel. At this time, the voltage of the electrode connected to the signal line S of the first switching element SWA is also 16V, and the gate voltage of the first switching element SWA is −37V relative to the voltage of the electrode connected to the signal line S. Therefore, the voltage between the source and the drain in the first switching element SWA becomes a substantially equal voltage and the leak current is suppressed. Therefore, in the example shown in FIG. 17A, the leak current (current Ids) flowing to the first switching elements SWA can be further suppressed than that in the case where the electric potential V11A of the first pixel electrode 11A exceeds +16V.

Figure 17B:
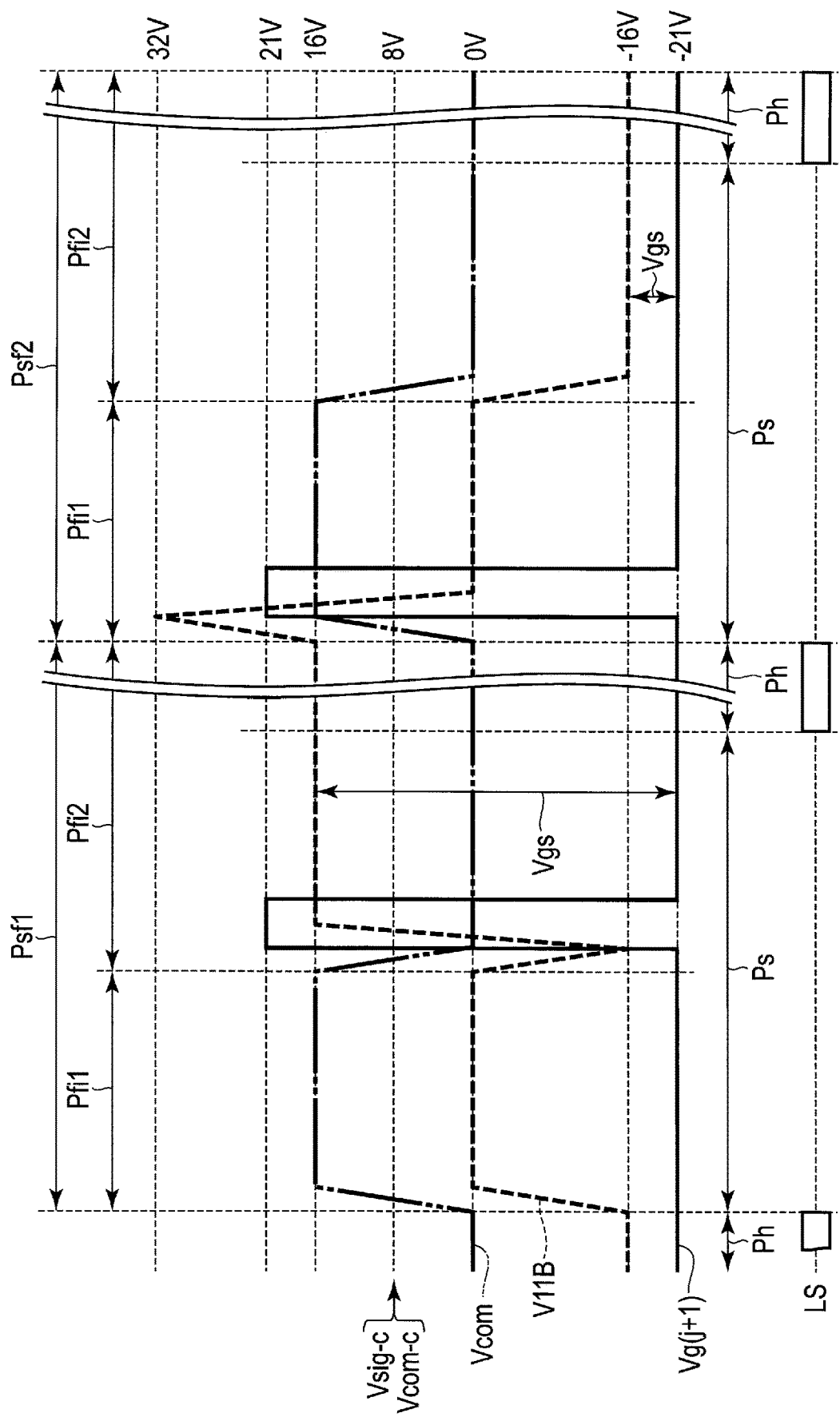
FIG. 17B is the other timing chart showing variations in a second pixel electrode potential, a common voltage, and a scanning signal voltage in a first sub-frame period and a second sub-frame period in a case of differentiating polarities of the pixels in each sub-frame period similarly to FIG. 17A.

FIG. 17B is the other timing chart showing variations in an electric potential of the second pixel electrode 11B, the common voltage Vcom, and a voltage of a scanning signal Vg(j+1) in the first sub-frame period Psf1 and the second sub-frame period Psf2. In FIG. 17B, too, the voltage value can be adjusted to the other value.

Applying the driving shown in FIG. 17B to the driving of the second pixel PXB (second liquid crystal layer 30B) connected to the even-numbered scanning line G(j+1) and the signal line S will be explained.

As shown in FIG. 17B and FIG. 7A, the Vcom circuit VC shown in FIG. 3 changes the common voltage Vcom supplied to the common electrode 21 from 0V to +16V, in the first field period Pfi1 of the first sub-frame period Psf1. The second switching elements SWB is in the off state. For this reason, the electric potential V11B of the second pixel electrode 11B is assumed to be shifted from −16V to 0V by the coupling effect.

In the first field period Pfi1, the negative-polarity voltage is applied to the first pixel electrode 11A as explained above.

Subsequently, the Vcom circuit VC shown in FIG. 3 changes the common voltage Vcom supplied to the common electrode 21 from +16V to 0V, in the second field period Pfi2 of the first sub-frame period Psf1. Next, the gate driver GD1 changes the voltage of the scanning signal Vg supplied to the scanning line G(j+1) from −21V to +21V, turns on the second switching element SWB, and applies the signal line voltage Vsig of +16V to the second pixel electrodes 11B. The electric potential V11B of the second pixel electrode 11B is thereby adjusted to, for example, +16V.

After that, the gate driver GD1 changes the voltage of the scanning signal Vg(j+1) supplied to the scanning line G(j+1) from +21V to −21V. Thus, the second switching element SWB becomes the off state and the electric potential V11B of the second pixel electrode 11B is held at +16V. In the second field period Pfi2, the voltage Vgs of the first switching element SWA becomes −37V. At this time, the voltage of the electrode connected to the signal line S of the first switching element SWA is also 16V, and the gate voltage of the first switching element SWA is −37V relative to the voltage of the electrode connected to the signal line S. Therefore, the voltage between the source and the drain in the first switching element SWA becomes a substantially equal voltage and the leak current is suppressed.

After that, the control unit CON changes the state of the light source unit LU to the first state in the holding period Ph. Then, the control unit CON changes the first state of the light source unit LU to the second state before the second field period Pfi2 of the first sub-frame period Psf1 ends.

As shown in FIG. 17B and FIG. 7B, the Vcom circuit VC shown in FIG. 3 changes the common voltage Vcom supplied to the common electrode 21 from 0V to +16V when the second field period Pfi2 of the first sub-frame period Psf1 is shifted to the first field period Pfi1 of the second sub-frame period Psf2, in the first field period Pfi1 of the first sub-frame period Psf1, in this example. Subsequently, the gate driver GD1 changes the voltage of the scanning signal Vg(j+1) supplied to the scanning line G(j+1) from −21V to +21V, turns on the second switching element SWB, and applies the signal line voltage Vsig of 0V to the second pixel electrodes 11B. The electric potential V11B of the second pixel electrode 11B is thereby adjusted to, for example, 0V.

After that, the gate driver GD1 changes the voltage of the scanning signal Vg(j+1) supplied to the scanning line G(j+1) from +21V to −21V. Thus, the second switching element SWB becomes the off state and the electric potential V11B of the second pixel electrode 11B is held at 0V.

After that, when the first field period Pfi1 is shifted to the second field period Pfi2 in the second sub-frame period Psf2, the gate driver GD1 maintains the voltage of the scanning signal Vg(j+1) supplied to the scanning line G(j+1) at −21V, and the Vcom circuit VC shown in FIG. 3 changes the common voltage Vcom supplied to the common electrode 21 from +16V to 0V. Then, the electric potential V11B of the second pixel electrode 11B is shifted to, for example, −16V by the coupling effect. In the second field period Pfi2, the voltage Vgs of the second switching element SWB becomes −5V. At this time, since the voltage of the electrode (source or drain) of the first switching element SWA connected to the signal line S is 16V, the gate voltage (Vgs or Vdg) to the electrode (source or drain) connected to the signal line S of the first switching element SWA is −37V. With reference to FIG. 15, the leak current of the switching element SW becomes smaller as the voltage Vgs (or Vgd) of the switching element SW is closer to approximately −3V to −10V. Therefore, the leak current is suppressed since the voltage Vgs (or Vgd) which is −37V is closer to approximately −3V to −10V than the voltage Vgs (or Vgd) of the first switching elements SWA which is −53V after the common voltage Vcom shown in FIG. 16 rises from 0V to 16V.

After that, the control unit CON changes the state of the light source unit LU to the first state in a holding period Ph subsequent to the scanning period Ps of the second field period Pfi2 of the second sub-frame period Psf2. Then, the control unit CON changes the first state of the light source unit LU to the second state before the second field period Pfi2 of the second sub-frame period Psf2 ends.

Based on the above, the control unit CON can suppress the leak current flowing to the second switching element SWB in a period in which at least the light-emitting element LS is turned on, of the second sub-frame period Psf2.

When a period including the first sub-frame period Psf1 and the second sub-frame period Psf2 is considered, the electric potential V11B of the second pixel electrode 11B is the negative value in the second field period Pfi2 of the second sub-frame period Psf2. For this reason, the leak current flowing to the second switching element SWB can be suppressed.

Next, an example of differentiating the polarities of the voltages written to the respective pixels PX in each frame period Pf, unlike the example shown in FIG. 17A and FIG. 17B, will be explained. The potential variation of the first pixel PXA and potential variation of the second pixel PXB in sequential first and second sub-frame periods will be explained.

Figure 18A:
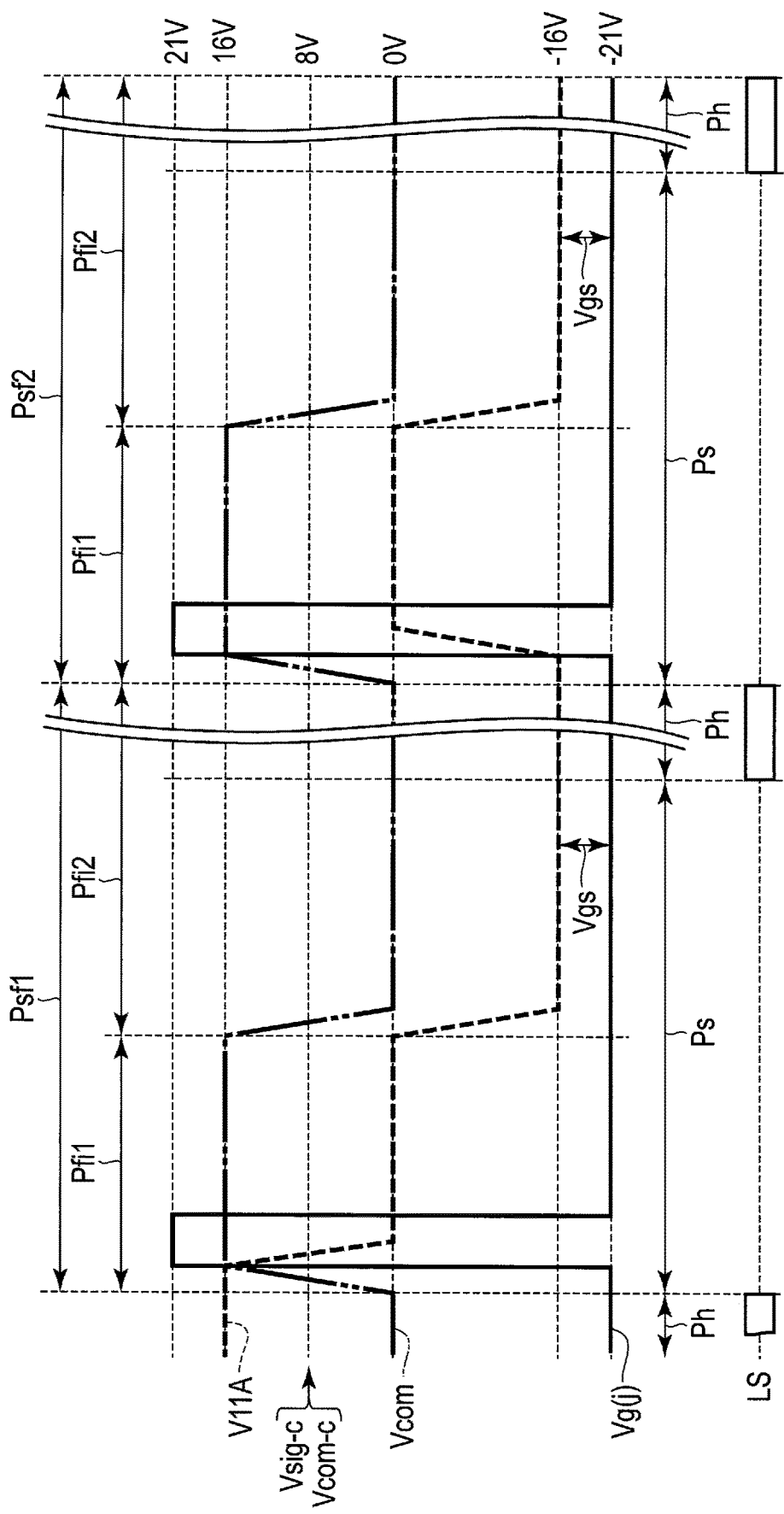
FIG. 18A is the other timing chart showing variations in a first pixel electrode potential, a common voltage, and a scanning signal voltage in a first sub-frame period and a second sub-frame period in a case of differentiating polarities of the pixels in each frame period.

FIG. 18A is the other timing chart showing variations in an electric potential of the first pixel electrode 11A, the common voltage Vcom, and a voltage of a scanning signal Vg(j) in the first sub-frame period Psf1 and the second sub-frame period Psf2. In FIG. 18A, too, the voltage value can be adjusted to the other value, similarly to the case shown in FIG. 16, and the waveform of the electric potential V11A can be varied from the waveform shown in FIG. 18A.

Applying the driving shown in FIG. 18A to the driving of the first pixel PXA (first liquid crystal layer 30A) connected to the odd-numbered scanning line G(j) and the signal line S will be explained. In the graph, the first field period Pfi1 is the odd-numbered field period, and the second field period Pfi2 is the even-numbered field period.

If the timing chart shown in FIG. 18A and the timing chart shown in FIG. 17A are compared, variations in the voltage and the electric potential of the first sub-frame period Psf1 are the same as each other. For this reason, the second sub-frame period Psf2 will be hereinafter explained.

As shown in FIG. 18A and FIG. 7A, the Vcom circuit VC shown in FIG. 3 changes the common voltage Vcom supplied to the common electrode 21 from 0V to +16V and changes the signal line voltage Vsig from 16V to 0V when the second field period Pfi2 of the first sub-frame period Psf1 is shifted to the first field period Pfi1 of the second sub-frame period Psf2. Subsequently, the gate driver GD2 changes the voltage of the scanning signal Vg(j) supplied to the scanning line G(j) from −21V to +21V, turns on the first switching element SWA, and applies the signal line voltage Vsig of 0V to the first pixel electrodes 11A. The electric potential V11A of the first pixel electrodes 11A is thereby adjusted to, for example, 0V.

After that, the gate driver GD2 changes the voltage of the scanning signal Vg(j) supplied to the scanning line G(j) from +21V to −21V. Thus, the first switching element SWA is turned off and the electric potential V11A of the first pixel electrodes 11A is held at 0V.

Next, when the first field period Pfi1 is shifted to the second field period Pfi2 in the second sub-frame period Psf2, the gate driver GD2 maintains the voltage of the scanning signal Vg(j) supplied to the scanning line G(j) at −21V, and the Vcom circuit VC shown in FIG. 3 changes the common voltage Vcom supplied to the common electrode 21 from +16V to 0V. Then, the electric potential V11A of the first pixel electrodes 11A is shifted to, for example, −16V by the coupling effect. In the second field period Pfi2, the voltage Vgs of the first switching element SWA becomes −5V. At this time, since the voltage of the electrode (source or drain) of the first switching element SWA connected to the signal line S is 16V, the gate voltage (Vgs or Vdg) to the electrode (source or drain) connected to the signal line S of the first switching element SWA is −37V. With reference to FIG. 15, the leak current of the switching element SW becomes smaller as the voltage Vgs (or Vgd) of the switching element SW is closer to approximately −3V to −10V. Therefore, the leak current is suppressed since the voltage Vgs (or Vgd) which is −37V is closer to approximately −3V to −10V than the voltage Vgs (or Vgd) of the first switching elements SWA which is −53V after the common voltage Vcom shown in FIG. 16 rises from 0V to 16V.

For this reason, increase in the value of the leak current (current Ids in FIG. 15) flowing to the first switching elements SWA can be suppressed in each of the second field periods Pfi2 in the graph.

After that, the control unit CON changes the state of the light source unit LU to the first state in a holding period Ph subsequent to the scanning period Ps of the second field period Pfi2 of the first sub-frame period Psf1. Then, the control unit CON changes the first state of the light source unit LU to the second state before the second field period Pfi2 of the second sub-frame period Psf2 ends.

Based on the above, the control unit CON can suppress the leak current flowing to the first switching element SWA in a period in which at least the light-emitting element LS is turned on.

Figure 18B:
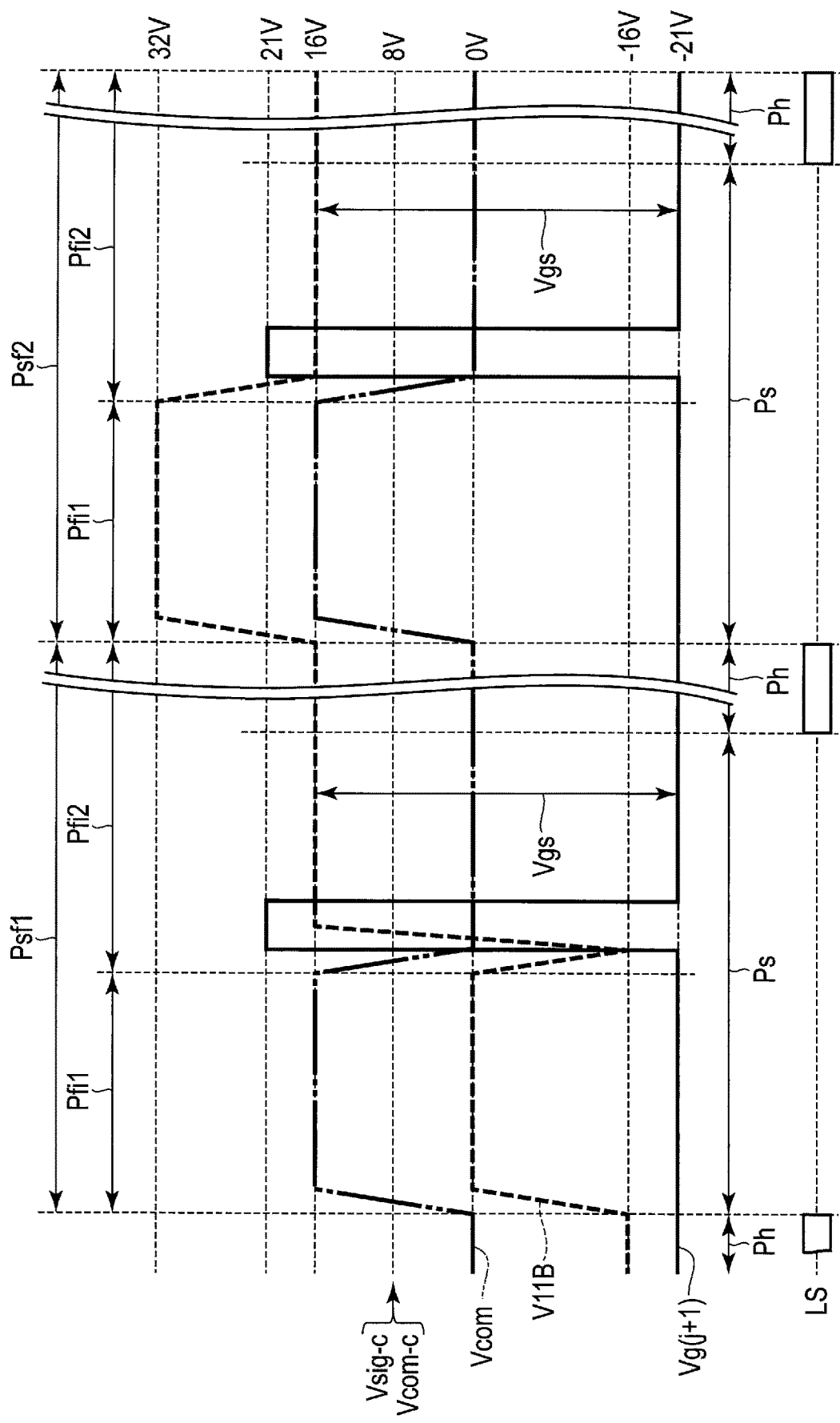
FIG. 18B is the other timing chart showing variations in a second pixel electrode potential, a common voltage, and a scanning signal voltage in a first sub-frame period and a second sub-frame period in a case of differentiating polarities of the pixels in each frame period similarly to FIG. 18A.

FIG. 18B is the other timing chart showing variations in an electric potential of the second pixel electrode 11B, the common voltage Vcom, and a voltage of a scanning signal Vg(j+1) in the first sub-frame period Psf1 and the second sub-frame period Psf2. In FIG. 18B, too, the voltage value can be adjusted to the other value.

Applying the driving shown in FIG. 18B to the driving of the second pixel PXB (second liquid crystal layer 30B) connected to the even-numbered scanning line G(j+1) and the signal line S will be explained. In the graph, the first field period Pfi1 is the odd-numbered field period, and the second field period Pfi2 is the even-numbered field period.

If the timing chart shown in FIG. 18B and the timing chart shown in FIG. 17B are compared, variations in the voltage and the electric potential of the first sub-frame period Psf1 are the same as each other. For this reason, the second sub-frame period Psf2 will be hereinafter explained.

As shown in FIG. 18B and FIG. 7B, the off state of the second switching element SWB is maintained when the second field period Pfi2 of the first sub-frame period Psf1 is shifted to the first field period Pfi1 of the second sub-frame period Psf2. The Vcom circuit VC shown in FIG. 3 changes the common voltage Vcom supplied to the common electrode 21 from 0V to +16V. Then, the electric potential V11B of the second pixel electrode 11B is shifted to, for example, +32V by the coupling effect.

After that, when the first field period Pfi1 is shifted to the second field period Pfi2 of the second sub-frame period Psf2, the Vcom circuit VC shown in FIG. 3 changes the common voltage Vcom supplied to the common electrode 21 from +16V to 0V and changes the signal line voltage Vsig to +16V. Subsequently, the gate driver GD1 changes the voltage of the scanning signal Vg(j+1) supplied to the scanning line G(j+1) from −21V to +21V, turns on the first switching element SWA, and applies the signal line voltage Vsig of +16V to the second pixel electrodes 11B. The electric potential V11B of the second pixel electrode 11B is thereby adjusted to, for example, 16V.

After that, the control unit CON changes the state of the light source unit LU to the first state in a holding period Ph subsequent to the scanning period Ps of the second field period Pfi2 of the second sub-frame period Psf2. Then, the control unit CON changes the first state of the light source unit LU to the second state before the second field period Pfi2 of the second sub-frame period Psf2 ends.

In each of the second field periods Pfi2 in the graph, the voltage Vgs of the second switching element SWB becomes −37V. At this time, the voltage of the electrode connected to the signal line S of the second switching element SWA is also 16V, and the gate voltage of the second switching element SWA is −37V relative to the voltage of the electrode connected to the signal line S. Therefore, the voltage between the source and the drain in the second switching element SWA becomes a substantially equal voltage and the leak current is suppressed.

In addition, if two sequential frame periods Pf are considered in either of the first pixel PXA and the second pixel PXB, the electric potential V11 of the pixel electrode 11 is a negative value in one of the frame periods Pf. For this reason, the leak current flowing to the switching element SW can be suppressed.

Next, an example of control of the display device DSP adopting the transparent scanning will be explained with reference to FIG. 19 to FIG. 23. The drive scheme in which one frame period includes plural sub-frame periods is applied to the display device DSP. Such a drive scheme is called, for example, field sequential system. Red, green, and blue images are displayed in respective sub-frame periods. The images of the colors displayed in time division are mixed and visually recognized as multi-color display image by the user. Furthermore, the drive in interlace system is executed in each of the sub-frame periods.

FIG. 19 is a diagram showing a configuration example of a timing controller TC shown in FIG. 3.

As shown in FIG. 19, the timing controller TC comprises a timing generation unit 50, a frame memory 51, line memories 52R, 52G, and 52B, a data conversion unit 53, a light source control unit 54, and the like.

The frame memory 51 has a capacity for storing image data for two frames, and stores image data for one frame input from the outside. The frame memory 51 reads the data for one frame in line unit for field sequential drive, stores the data in the line memories 52R, 52G, and 52B, and stores video data of a subsequent frame for remaining one frame. The frame memory 51 alternately repeats reading and writing in unit of one frame. The line memories 52R, 52G, and 52B store sub-frame data of red, green, and blue colors, respectively. The sub-frame data represent red, green, and blue images (for example, gradation values of the pixels PX) which the pixels PX are urged to display in time division.

The data conversion unit 53 processes the sub-frame data of the colors stored in the line memories 52R, 52G, and 52B by various types of data conversion such as gamma correction, generates a video signal, and outputs the video signal to the above-explained source driver SD. The timing controller TC may be configured to send RGB data to the data conversion unit 53 by allocating the RGB data in the frame memory 51. In this case, the timing controller TC can be constituted without the line memories 52R, 52G, and 52B.

The light source control unit 54 outputs the light source control signal to the above-explained light source driver LSD. The light source driver LSD drives the light-emitting elements LSR, LSG, and LSB in accordance with the light source control signal. The light-emitting elements LSR, LSG, and LSB can be driven under, for example, pulse width modulation (PWM) control. That is, the light source driver LSD can adjust the luminance of each of the light-emitting elements LSR, LSG, and LSB with the duty ratios of the signals output to the light-emitting elements LSR, LSG, and LSB.

The timing generation unit 50 controls the operation timing of the frame memory 51, the line memories 52R, 52G, and 52B, the data conversion unit 53, and the light source control unit 54, in synchronization with a horizontal synchronization signal Hsync and a vertical synchronization signal Vsync input from the outside. In addition, the timing generation unit 50 controls the source driver SD by outputting a source driver control signal, controls the gate drivers GD1 and GD2 by outputting gate driver control signals, and outputs the Vcom control signal.

Figure 20:
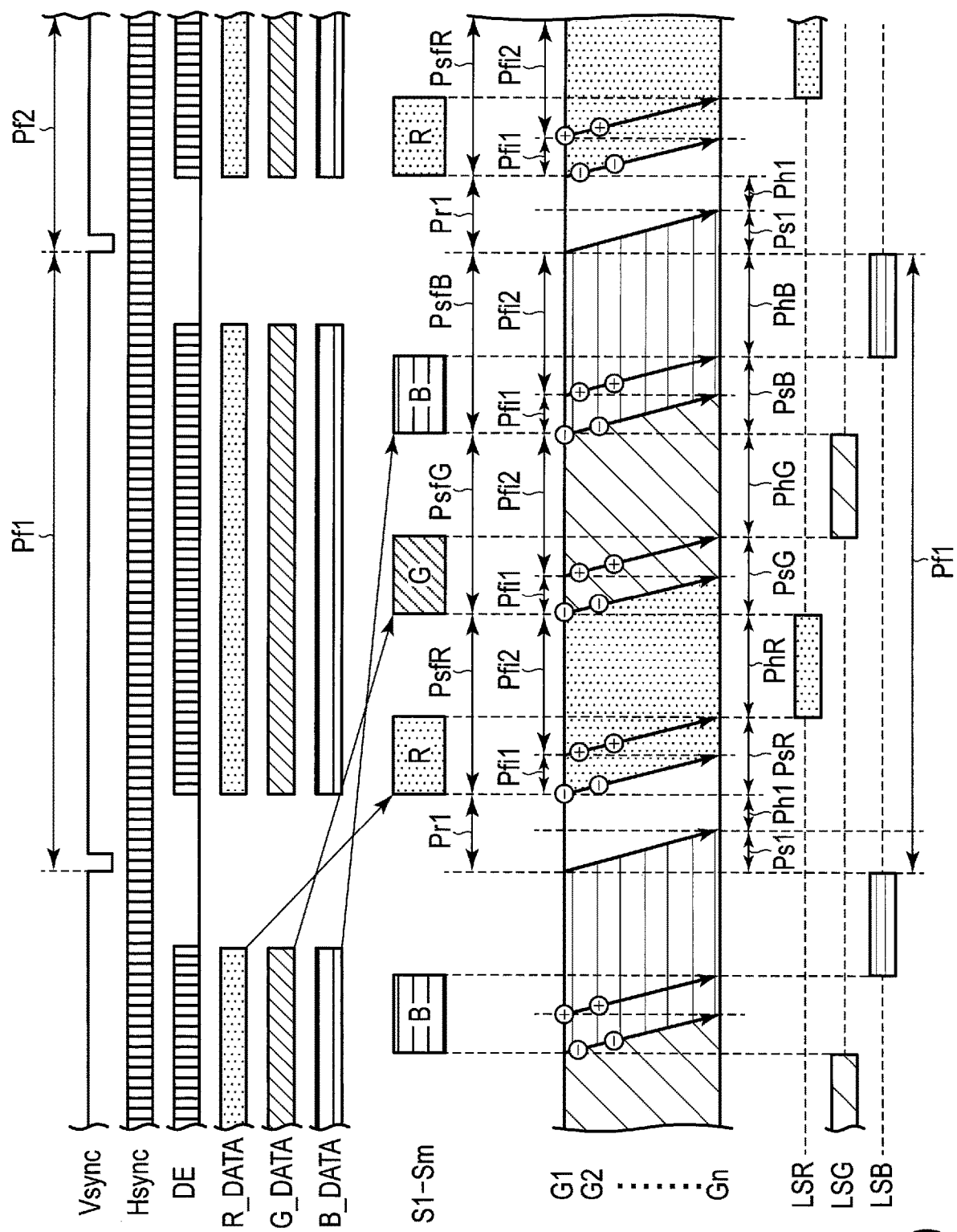
FIG. 20 is a timing chart showing an example of the display operation.

FIG. 20 is a timing chart showing an example of the display operation. This example corresponds to the display operation employing the above-explained third driving method.

As shown in FIG. 20, the vertical synchronization signal Vsync falls at start of one frame. That is, a time when the vertical synchronization signal Vsync falls and then falls again corresponds to the frame period (one frame period) Pf in this example. For example, if the display device DSP is driven at 60 Hz, the frame period Pf is approximately 16.7 ms.

The frame period Pf includes a first reset period Pr1 in which the above-explained transparent scanning is executed, a first sub-frame period PsfR, a second sub-frame period PsfG, and a third sub-frame period PsfB. Each of the sub-frame periods Psf corresponds to a sum of the scanning period Ps in which the above-explained display scanning is executed and the holding period Ph (illumination period of the light-emitting element LS). In this example, the first reset period Pr1 is a leading period of the frame period Pf. The first reset period Pr1, the first sub-frame period PsfR, the second sub-frame period PsfG, and the third sub-frame period PsfB follow in this order. Unless this example, however, the first reset period Pr1 may not be the leading period of the frame period Pf, but the last period of the frame period Pf.

In the first reset period Pr1 of the first frame period Pf1, the transparent scanning is executed under control of the timing controller TC. That is, in the first reset period Pr1, the gate drivers GD1 and GD2 sequentially supply a high-level (for example, above-explained +21V) scanning signal to scanning lines G1 to Gn. Furthermore, the source driver SD supplies, for example, the signal line voltage Vsig having the same value as the common voltage Vcom to each of the signal lines S1 to Sm while the scanning signal is supplied. The second transparent voltage is applied between the common electrodes 21 and the pixel electrodes 11 of all the pixels PX, i.e., applied to all the first liquid crystal layers 30A and all the second liquid crystal layers 30B by this operation. After the scanning signal is supplied to the corresponding scanning line G, the pixel electrode 11 of each pixel PX can hold the electric potential until the scanning signal is supplied to the subsequent scanning line G. Therefore, in the pixel PX to which the second transparent voltage is written, the second transparent voltage is held until the subsequent scanning signal is supplied to the corresponding scanning line G.

In the pixel PX to which the second transparent voltage is written, visibility of the background of the display panel PNL can be increased since the liquid crystal layer 30 is in a preferable transparent state. In the present embodiment, the light-emitting elements LSR, LSG, and LSB are turned off in the first reset period Pr1. The light-emitting elements LSR, LSG, and LSB are desirably turned off in the first reset period Pr1 but may be turned on in the first reset period Pr1.

The signal line voltage Vsig supplied to the signal lines S1 to Sm in the first reset period Pr1 does not need to be the same as the common voltage Vcom if the voltage written to each of the pixels PX is the value regarded as the second transparent voltage. Various aspects explained with reference to FIG. 13 and FIG. 14 can be applied to the common voltage Vcom and the signal line voltage Vsig in the transparent scanning.

A period in which the scanning signal is sequentially supplied to the scanning lines G1 to Gn in the first reset period Pr1 is a scanning period Ps1. The first reset period Pr1 includes a holding period Ph1 for further holding the second transparent voltage after the scanning period Ps1. However, the first reset period Pr1 may not include the holding period Ph1. In this case, Ps1 is equal to Pr1 with respect to the time period.

In the transparent scanning, the scanning signal may be simultaneously supplied to all the scanning lines G. In this case, too, the second transparent voltage can be written to all the first liquid crystal layers 30A and all the second liquid crystal layers 30B.

As shown in FIG. 20 and FIG. 7A, the first sub-frame period PsfR, the second sub-frame period PsfG, and the third sub-frame period PsfB follow in this order but, unlike this example, the order of the sub-frame periods Psf may be different. In each of the sub-frame periods Psf, the timing generation unit 50 controls the frame memory 51, the line memories 52R, 52G, and 52B, and the data conversion unit 53 by the data synchronization signal DE, and urges the display scanning of each color to be executed.

The first sub-frame period PsfR includes a scanning period PsR and a holding period PhR. In addition, the first sub-frame period PsfR includes the first field period Pfi1 and the second field period Pfi2. The scanning period PsR includes the whole first field period Pfi1 and a leading period of the second field period Pfi2. The holding period PhR includes the remaining period of the second field period Pfi2. The light-emitting element LSR is turned on in the holding period PhR.

In the first field period Pfi1, drive targets are first drive areas DA1, and the gate driver GD2 sequentially supplies a high-level (for example, above-explained +21V) scanning signal to odd-numbered scanning lines G1, G3, . . . , and Gn−1. Further, while a scanning signal is supplied, the source driver SD applies signal line voltage Vsig to the signal lines S1 to Sm in accordance with the red sub-frame data (R_DATA) stored in the line memory 52R. More specifically, the operation of supplying the signal line voltage Vsig of the gradation corresponding to each of the pixels PX of the line to which the scanning signal is supplied, simultaneously, to the signal lines S1 to Sm is repeated. The signal line voltage Vsig is supplied to the first pixel electrode 11A of the first pixel PXA corresponding to the selected scanning line G via the first switching element SWA and then the electric potential of the first pixel electrode 11A is held by changing the state of the first switching element SWA to the non-conductive state. After that, subsequent odd-numbered scanning lines G are selected and the same drive is sequentially executed.

In the first field period Pfi1 of the first sub-frame period PsfR, the negative-polarity drive voltage is applied to the first pixel PXA (first liquid crystal layer 30A).

After that, in a period which is the second field period Pfi2 and the scanning period PsR, drive targets are second drive areas DA2, and the gate driver GD1 sequentially supplies a high-level (for example, above-explained +21V) scanning signal to even-numbered scanning lines G2, G4, . . . , and Gn. Further, while a scanning signal is supplied, the source driver SD applies signal line voltage Vsig to the signal lines S1 to Sm in accordance with the red sub-frame data (R_DATA) stored in the line memory 52R. More specifically, the operation of supplying the signal line voltage Vsig of the gradation corresponding to each of the pixels PX of the line to which the scanning signal is supplied, simultaneously, to the signal lines S1 to Sm is repeated. The signal line voltage Vsig is supplied to the second pixel electrode 11B of the second pixel PXB corresponding to the selected scanning line G via the second switching element SWB and then the electric potential of the second pixel electrode 11B is held by changing the state of the second switching element SWB to the non-conductive state. After that, subsequent even-numbered scanning lines G are selected and the same drive is sequentially executed.

In the second field period Pfi2 of the first sub-frame period PsfR, the positive-polarity drive voltage is applied to the second pixel PXB (second liquid crystal layer 30B).

The voltage corresponding to the red sub-frame data is applied between the common electrode 21 and the pixel electrode 11 of each of the pixels PX by this operation. In each field period Pfi, the signal line voltage Vsig supplied to the pixel electrodes 11 via the signal lines S1 to Sm is different in polarity from the common voltage Vcom of the common electrode 21 or equal to the reference voltage Vsig-c. An absolute value of the voltage written to each of the pixels PX is more than and equal to 8V and less than and equal to 16V. The holding period PhR is a period after writing to all the first liquid crystal layers 30A and all the second liquid crystal layers 30B is completed and before the second sub-frame period PsfG comes. The light-emitting element LSR emits red light in the holding period PhR. A red image is thereby displayed in the display area DA.

The operation in the second sub-frame period PsfG and the third sub-frame period PsfB is the same as that in the first sub-frame period PsfR.

That is, the second sub-frame period PsfG includes the first field period Pfi1 and the second field period Pfi2. In the first field period Pfi1, the voltage corresponding to green sub-frame data (G_DATA) stored in the line memory 52G is written to each first pixel PXA of the first drive areas DA1. In the second field period Pfi2, the voltage corresponding to green sub-frame data (G_DATA) stored in the line memory 52G is written to each second pixel PXB of the second drive areas DA2. The light-emitting element LSG emits green light in the holding period PhG. A green image is thereby displayed in the display area DA.

In the first field period Pfi1 of the second sub-frame period PsfG, the negative-polarity drive voltage is applied to the first pixel PXA (first liquid crystal layer 30A). In the second field period Pfi2 of the second sub-frame period PsfG, the positive-polarity drive voltage is applied to the second pixel PXB (second liquid crystal layer 30B).

The third sub-frame period PsfB includes the first field period Pfi1 and the second field period Pfi2. In the first field period Pfi1, the voltage corresponding to blue sub-frame data (B_DATA) stored in the line memory 52B is written to each first pixel PXA of the first drive areas DA1. In the second field period Pfi2, the voltage corresponding to blue sub-frame data (B_DATA) stored in the line memory 52B is written to each second pixel PXB of the second drive areas DA2. The light-emitting element LSB emits blue light in the holding period PhB. A blue image is thereby displayed in the display area DA.

In the first field period Pfi1 of the third sub-frame period PsfB, the negative-polarity drive voltage is applied to the first pixel PXA (first liquid crystal layer 30A). In the second field period Pfi2 of the third sub-frame period PsfB, the positive-polarity drive voltage is applied to the second pixel PXB (second liquid crystal layer 30B).

In the first frame period Pf1, image data displayed in the subsequent second frame period Pf2 are written to the frame memory 51. Furthermore, the sub-frame data of the line memories 52R, 52G, and 52B which writing to the pixels PX completed are rewritten to sub-frame data corresponding to the image data written to the frame memory 51.

The multi-color display image is visually recognized for the user by mixing red, green, and blue images displayed in time division in the first sub-frame period PsfR, the second sub-frame period PsfG, and the third sub-frame period PsfB. In addition, in the first reset period Pr1, the second transparent voltage is applied between the common electrode 21 and the pixel electrode 11 in each pixel PX. The transparency of the display area DA is increased and the visibility of the background of the display area DA is improved, by repeating the first reset period Pr1 in each frame.

In each of the holding periods Ph shown in FIG. 20, an absolute value of the negative voltage Vgs cannot be 53V (FIG. 16). For this reason, increase in the value of the leak current (current Ids) flowing to the switching element SWA can be suppressed in the holding period Ph.

As the rate of the first reset period Pr1 to the frame period Pf becomes larger, the transparency of the display area DA is increased but the image visibility may be reduced. For example, the length of the first reset period Fri is desirably smaller than or equal to a half of the length of the frame period Pf in consideration of these matters. However, if the transparency is considered important, the rate of the first reset period Pr1 to the frame period Pf may be made larger. For example, the first sub-frame period PsfR, the second sub-frame period PsfG, and the third sub-frame period PsfB can be set to have the same length. The color chromaticity of the display image may be adjusted by differentiating the proportion of the first sub-frame period PsfR, the second sub-frame period PsfG, and the third sub-frame period PsfB.

Next, the second transparent voltage is applied to all the first liquid crystal layers 30A and all the second liquid crystal layers 30B in the first reset period Pr1 of the second frame period Pf2.

As shown in FIG. 20 and FIG. 7B, the first frame period Pf1 shifts to the first sub-frame period PsfR of the second frame period Pf2. In the first field period Pfi1, drive targets are second drive areas DA2, the gate driver GD1 sequentially supplies a high-level scanning signal to the even-numbered scanning lines G2, G4, . . . , and Gn, and the source driver SD supplies the signal line voltage Vsig to each of the signal lines S1 to Sm.

After that, in a period which is the second field period Pfi2 and which is the scanning period PsR, drive targets are the first drive areas DA1, the gate driver GD2 sequentially supplies a high-level scanning signal to the odd-numbered scanning lines G1, G3, . . . , and Gn−1, and the source driver SD supplies the signal line voltage Vsig to each of the signal lines S1 to Sm.

The operation in the second sub-frame period PsfG and the third sub-frame period PsfB is the same as that in the first sub-frame period PsfR.

In the second frame period Pf2, the negative-polarity voltage (negative-polarity drive voltage) is applied to the second pixel PXB (second liquid crystal layer 30B) of the second drive areas DA2, and the positive-polarity voltage (positive-polarity drive voltage) is applied to the first pixel PXA (first liquid crystal layer 30A) of the first drive areas DA1. The polarity of the voltage written to each of the pixels PX in the first frame period Pf1 is different from that in the second frame period Pf2. Based on the above, a frame inversion drive scheme is executed in each of the pixels PX.

Next, a display operation different from the display operation shown in FIG. 20 will be explained.

Figure 21:
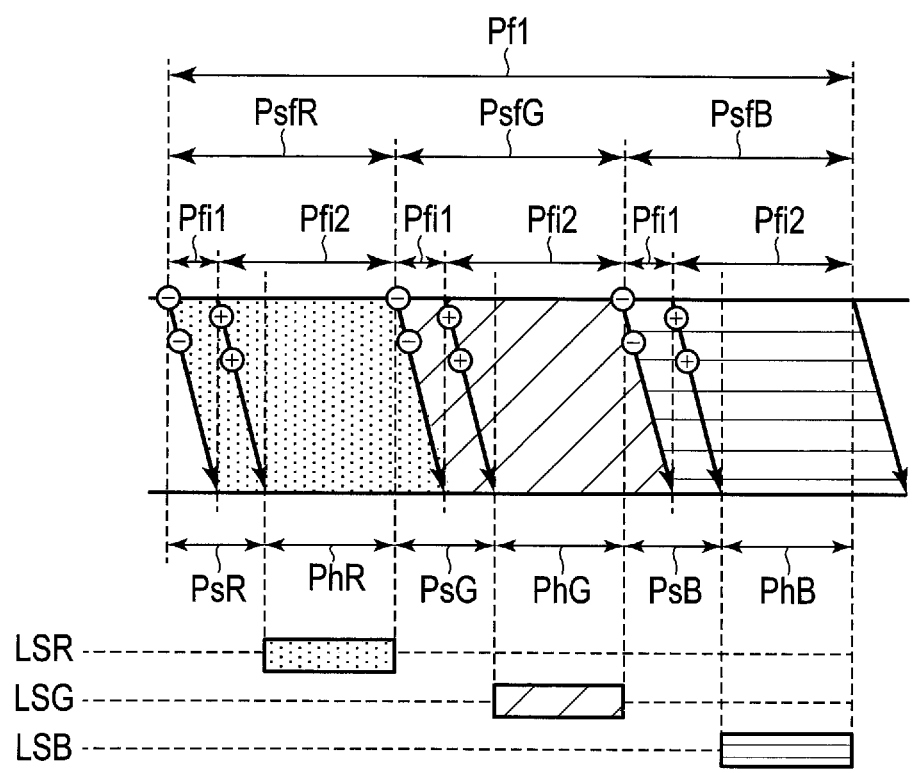
FIG. 21 is a timing chart showing another example of the display operation.

For example, as shown in FIG. 21, one frame period Pf may not include the first reset period Pr1.

Alternatively, the frame period Pf may include not only the first reset period Pr1, but also the second reset period and the third reset period, though not shown in the figures. The second reset period is a period between the first sub-frame period PsfR and the second sub-frame period PsfG. The third reset period is a period between the second sub-frame period PsfG and the third sub-frame period PsfB.

Figure 22:
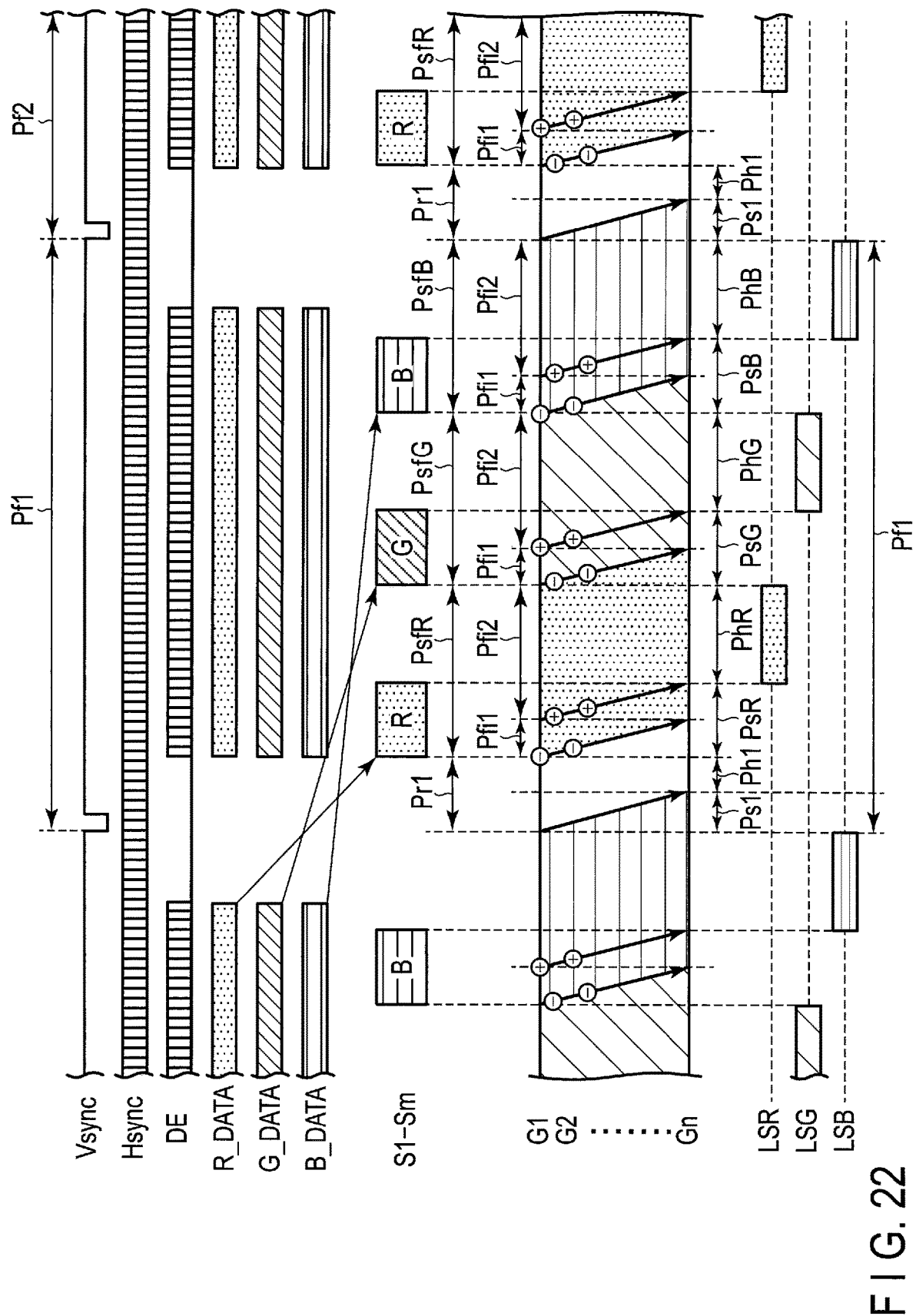
FIG. 22 is a timing chart showing another example of the display operation.

As shown in FIG. 22, the polarity of the voltage written to each of the pixels PX may be differentiated in each sub-frame period Psf. Based on the above, a sub-frame inversion drive scheme is executed in each of the pixels PX. This example corresponds to the display operation employing the above-explained fourth driving method.

The display operation shown in FIG. 22 can also be variously modified.

For example, as shown in FIG. 23, one frame period Pf may not include the first reset period Pr1.

Alternatively, the frame period Pf may include not only the first reset period Pr1, but also the second reset period and the third reset period, though not shown in the figures.

According to the display drive DSP of the first embodiment configured as explained above, the drive in the interlace system can be executed for each sub-frame period Psf. The number of times of polarity inversion for each frame period can be remarkably reduced, which can contribute to low power consumption. The polarity distribution of the pixel PX is the same as the polarity distribution of the pixel PX when simple line-inversion drive scheme is executed. For this reason, occurrence of flicker can be suppressed as compared with executing simple frame-inversion drive scheme. In addition, the voltage Vgs for turning off the switching element SW is considered when the pixel PX is driven. For this reason, increase in the leak current flowing to the switching element SW can be suppressed.

In addition, according to the configuration of the present embodiment, the display device DSP can be driven with the source driver SD of a low withstand voltage. This advantage will be explained with reference to FIG. 6 and FIG. 12.

A comparative example in which the common voltage Vcom is a DC voltage and the polarity of the signal line voltage Vsig alone is inversed about the common voltage Vcom is assumed. In this case, 0V voltage can be applied to the liquid crystal layer 30 of each pixel area, even in the general display scanning, by making the signal line voltage Vsig equal to the common voltage Vcom. In this comparative example, however, the signal line voltage Vsig must be variable within a range between −16V and +16V to the common voltage Vcom to use the scattering voltage shown in FIG. 6 for the gradation expression. That is, the circuit such as the source driver SD needs to have the withstand voltage of 32V.

In contrast, according to the present embodiment, the signal line voltage Vsig and the common voltage Vcom may be variable within a range of, for example, 16V as shown in FIG. 12. That is, the circuit such as the source driver SD sufficiently has the withstand voltage of 16V. Thus, the circuit size and the manufacturing costs can be reduced by suppressing the withstand voltage of the circuits.

In addition to the above-described advantages, various preferable advantages can be obtained from the present embodiment.

Second Embodiment

In the second embodiment, explanations are mainly focused on differences from the first embodiment, and the explanations of the same constituent elements as those of the first embodiment are omitted.

FIG. 24 is a diagram showing main constituent elements of a display device DSP according to the present embodiment.

As shown in FIG. 24, the display device DSP is different from that shown in FIG. 3 with respect to a feature that the controller CNT comprises a level conversion circuit (L/S circuit) LSC and a Vcom pull-in circuit LIC.

A common voltage (Vcom) supplied from a Vcom circuit VC is supplied to a common electrode 21 and also to the Vcom pull-in circuit LIC. The Vcom pull-in circuit LIC is intervened between a source driver SD and each of signal lines S. The Vcom pull-in circuit LIC supplies a video signal output from the source driver SD to each of signal lines S. In addition, the Vcom pull-in circuit LIC can also supply common voltage from the Vcom circuit VC to each of the signal lines S.

FIG. 25 is a diagram showing a configuration example of the Vcom pull-in circuit LIC. The Vcom pull-in circuit LIC comprises switching elements SW1 to SWm. The switching elements SW1 to SWm are disposed on, for example, a first substrate SUB1 of a display panel PNL. A line LN1 is connected to input terminals (sources) of the switching elements SW1 to SWm, the signal lines S1 to Sm are connected to output terminals (drains) of the switching elements, respectively, and a line LN2 is connected to control terminals (gates) of the switching elements.

The Vcom circuit VC shown in FIG. 24 supplies a common voltage Vcom to a line LN1. This operation can be applied to the drive when writing the second transparent voltage to the pixel PX, applied to the drive in the reset period, or applied to both the drive when writing the second transparent voltage to the pixel PX and the drive in the reset period. When the Vcom pull-in circuit LIC supplies the common voltage Vcom to the signal lines S1 to Sm, the output of the source driver SD is controlled at high impedance. In addition, the timing controller TC outputs a control signal to a level conversion circuit LSC when the transparent scanning is performed. The level conversion circuit LSC converts this control signal into a voltage of a predetermined level and supplies the voltage to a line LN2. When the control signal is supplied to the line LN2, the line LN1 and the signal lines S1 to Sm become conductive and the common voltage Vcom of the line LN1 is supplied to each of the signal lines S1 to Sm.

If the scanning signal is supplied to each of the scanning lines G1 to Gn when such a common voltage Vcom is supplied to each of the signal lines S1 to Sm, the common voltage Vcom of each of the signal lines S1 to Sm is supplied to each pixel electrode 11. That is, a potential difference between each of pixel electrodes 11 and a common electrode 21 becomes 0V (second transparent voltage).

The same advantages as those of the first embodiment can also be obtained from the configuration of the present embodiment. According to the configuration of the present embodiment, a circuit for supplying the voltage (for example, the common voltage Vcom) for transparent scanning to the source driver SD and the like do not need to be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. It is possible to combine two or more of the embodiments with each other if needed.

For example, the sub-frame data stored in the line memories 52R, 52G, and 52B are examples of the first sub-frame data representing the image of the first color, the second sub-frame data representing the image of the second color, and the third sub-frame data representing the image of the third color.

The first, second, and third colors are not limited to red, blue, and green colors. In addition, the light source unit LU may comprise light-emitting elements LS of two or less colors or may comprise light-emitting elements LS of four or more colors. The number of line memories, the number of the sub-frame data, and the number of the sub-frame periods may be increased or reduced in accordance with the number of types (number of colors) of the light-emitting elements LS.

The liquid crystal layer 30 may employ normal polymer dispersed liquid crystal. The liquid crystal layer 30 maintains parallelism of light incident when the applied voltage is high or scatters the incident light when the applied voltage is low.

What is claimed is:

1. A display device, comprising:
a display panel including a display area where first drive areas extending in a row direction and second drive areas extending in the row direction are alternately disposed in a columnar direction, and a layer which includes first liquid crystal areas located in the first drive areas and second liquid crystal areas located in the second drive areas and which is changed to a transparent state of urging incident light to be transmitted and a scattering state of scattering the incident light; and
a control circuit which controls drive of the display panel and changes a state of the layer to at least one of the transparent state and/or the scattering state,
wherein
a frame period includes multiple sub-frame periods, and each sub-frame period includes at least a first field period and a second field period,
the control circuit applies a drive voltage to the first liquid crystal areas, in a first field period of a first sub-frame period,
the control circuit applies the drive voltage to the second liquid crystal areas, in a second field period following the first field period of a first sub-frame period, and
a polarity of the drive voltage in the first field period is different from a polarity of the drive voltage in the second field period.

2. The display device of claim 1, wherein
the display panel further includes:
first scanning lines and second scanning lines extending in the row direction and alternately disposed in the columnar direction;
first pixel electrodes for one row located in each of the first drive areas, electrically connected to one of the first scanning lines, and arranged in the row direction;
second pixel electrodes for one row located in each of the second drive areas, electrically connected to one of the second scanning lines, and arranged in the row direction;
first thin-film transistors each comprising a gate electrode connected to corresponding one of the first scanning lines and a source electrode connected to corresponding one of the first pixel electrodes; and
second thin-film transistors each comprising a gate electrode connected to corresponding one of the second scanning lines and a source electrode connected to corresponding one of the second pixel electrodes,
either the first field period or the second field period is an odd-numbered field period, and
the other of the first field period and the second field period is an even-numbered field period.

3. The display device of claim 1, further comprising:
a light source located in a non-display area outside the display area and having a state changed to a first state of emitting light to the layer or a second state of suspending light emission to the layer by the control unit,
wherein
the control circuit applies the drive voltage of negative polarity to either the first areas or the second areas in the first field period of each of sub-frame periods,
the control circuit applies the drive voltage of positive polarity to the others of the first liquid crystal areas and the second liquid crystal areas in the second field period of each of sub-frame periods,
the control circuit changes the state of the light source to the first state in a period of the second field period after the application of the drive voltage of positive polarity to the others has ended,
the control circuit changes the state of the light source to the second state from the first state before the second field period ends, and
the control circuit replaces targets to which the drive voltage of the negative polarity is applied in the first field period and targets to which the drive voltage of the positive polarity is applied in the second field period every time the sub-frame periods or frame periods are changed.

4. The display device of claim 1, further comprising:
a light source located in a non-display area outside the display area and emitting light of first, second, and third colors to the layer,
wherein
the control circuit controls drive of the light source,
the control circuit emits the light of the first color to the layer in the first sub-frame period of the first frame period,
the control circuit emits the light of the second color to the layer in a second sub-frame period subsequent to the first sub-frame period of the first frame period,
the control circuit emits the light of the third color to the layer in a third sub-frame period subsequent to the second sub-frame period of the first frame period,
each of the first sub-frame period, the second sub-frame period, and the third sub-frame period includes the first field period and the second field period, and
in each of the sub-frame periods, a polarity of the drive voltage in the first field period is different from a polarity of the drive voltage in the second field period.

5. The display device of claim 4, wherein
the control circuit applies the drive voltage of negative polarity to either the first liquid crystal areas or the second liquid crystal areas in the first field period of each of sub-frame periods, and
the control circuit applies the drive voltage of positive polarity to the others of the first liquid crystal areas and the second liquid crystal areas in the second field period of each of sub-frame periods.

6. The display device of claim 5, wherein
the control circuit fixes targets to which the drive voltage of the negative polarity is applied in the first field period to either the first liquid crystal areas or the second liquid crystal areas in the first frame period, the control circuit fixes targets to which the drive voltage of the positive polarity is applied in the second field period to the others of the first liquid crystal areas and the second liquid crystal areas in the first frame period, and the control circuit replaces the targets to which the drive voltage of the negative polarity is applied in the first field period and the targets to which the drive voltage of the positive polarity is applied in the second field period every time the frame periods are changed.

7. The display device of claim 5, wherein
the control circuit changes targets to which the drive voltage of the negative polarity is applied in the first field period to either the first liquid crystal areas or the second liquid crystal areas every time the sub-frame periods are changed, and the control circuit changes targets to which the drive voltage of the positive polarity is applied in the second field period to the others of the first liquid crystal areas and the second layers liquid crystal areas every time the sub-frame periods are changed.

8. The display device of claim 4, wherein
if the drive voltage applied to the layer is a first transparent voltage or a second transparent voltage, a state of the layer is changed to the transparent state, if the drive voltage applied to the layer is a scattering voltage, a state of the layer is changed to the scattering state, parallelism of light transmitted through the layer when the second transparent voltage is applied is higher than parallelism of light transmitted through the layer when the first transparent voltage is applied, the first frame period further includes a first reset period that is a leading period of the first frame period, and in the first reset period, the control circuit applies the second transparent voltage to the first liquid crystal areas and the second liquid crystal areas, and changes a state of the light source to a non-illumination state in which light is not emitted to the layer.

9. The display device of claim 8, wherein
the display panel further comprises a pixel electrode and a common electrode, and
the second transparent voltage is 0V and a voltage applied between the pixel electrode and the common electrode.

10. A liquid crystal display device, comprising:
a display panel including a display area where first drive areas extending in a row direction and second drive areas extending in the row direction are alternately disposed in a columnar direction, and a liquid crystal layer which includes first liquid crystals located in the first drive areas and second liquid crystals located in the second drive areas and which is changed to a transparent state of urging incident light to be transmitted and a scattering state of scattering the incident light by using reverse mode polymer dispersed liquid crystal; and a control circuit which controls drive of the display panel and changes a state of the liquid crystal layer to at least one of the transparent state and/or the scattering state, wherein a frame period includes multiple sub-frame periods, and each sub-frame period includes at least a first field period and a second field period, the control circuit applies a drive voltage to the first liquid crystals, in a first field period of a first sub-frame period, the control circuit applies the drive voltage to the second liquid crystals, in a second field period following the first field period of a first sub-frame period, and a polarity of the drive voltage in the first field period is different from a polarity of the drive voltage in the second field period.

11. The liquid crystal display device of claim 10, further comprising:
a light source located in a non-display area outside the display area and having a state changed to a first state of emitting light to the liquid crystal layer or a second state of suspending light emission to the liquid crystal layer by the control circuit, wherein
the control circuit applies the drive voltage of negative polarity to either the first liquid crystals or the second liquid crystals in the first field period of each of sub-frame periods, the control circuit applies the drive voltage of positive polarity to the others of the first liquid crystals and the second liquid crystals in the second field period of each of sub-frame periods, the control circuit changes the state of the light source to the first state in a period of the second field period after the application of the drive voltage of positive polarity to the others has ended, the control circuit changes the state of the light source to the second state from the first state before the second field period ends, and the control circuit replaces targets to which the drive voltage of the negative polarity is applied in the first field period and targets to which the drive voltage of the positive polarity is applied in the second field period every time the sub-frame periods or frame periods are changed.

12. The liquid crystal display device of claim 10, further comprising:
a light source located in a non-display area outside the display area and emitting light of first, second, and third colors to the liquid crystal layer, wherein
the control circuit controls drive of the light source,
the control circuit emits the light of the first color to the liquid crystal layer in the first sub-frame period of the first frame period, the control circuit emits the light of the second color to the liquid crystal layer in a second sub-frame period subsequent to the first sub-frame period of the first frame period, the control circuit emits the light of the third color to the liquid crystal layer in a third sub-frame period subsequent to the second sub-frame period of the first frame period, each of the first sub-frame period, the second sub-frame period, and the third sub-frame period includes the first field period and the second field period, and in each of the sub-frame periods, a polarity of the drive voltage in the first field period is different from a polarity of the drive voltage in the second field period.

13. The liquid crystal display device of claim 12, wherein
the control circuit applies the drive voltage of negative polarity to either the first liquid crystals or the second liquid crystals in the first field period of each of sub-frame periods, and the control circuit applies the drive voltage of positive polarity to the others of the first liquid crystals and the second liquid crystals in the second field period of each of sub-frame periods.

* * * * *